United States Patent
Xu et al.

(10) Patent No.: US 11,209,696 B2
(45) Date of Patent: Dec. 28, 2021

(54) BACKLIGHT MODULE, DISPLAY APPARATUS AND METHOD FOR MANUFACTURING DISPLAY APPARATUS

(71) Applicants: BOE Technology Group Co., Ltd., Beijing (CN); Chengdu BOE Optoelectronics Technology Co., Ltd., Chengdu (CN)

(72) Inventors: Bing Xu, Beijing (CN); Lichuan Xiao, Beijing (CN)

(73) Assignees: BOE TECHNOLOGY GROUP CO., LTD., Beijing (CN); CHENGDU BOE OPTOELECTRONICS TECHNOLOGY CO., LTD, Sichuan (CN)

(*) Notice: Subject to any disclaimer, the term of this patent is extended or adjusted under 35 U.S.C. 154(b) by 772 days.

(21) Appl. No.: 16/074,514

(22) PCT Filed: Feb. 7, 2018

(86) PCT No.: PCT/CN2018/075629
§ 371 (c)(1),
(2) Date: Aug. 1, 2018

(87) PCT Pub. No.: WO2018/166311
PCT Pub. Date: Sep. 20, 2018

(65) Prior Publication Data
US 2021/0208456 A1 Jul. 8, 2021

(30) Foreign Application Priority Data
Mar. 14, 2017 (CN) .......................... 201710151394.4

(51) Int. Cl.
*G02F 1/13357* (2006.01)
*G02F 1/1333* (2006.01)

(52) U.S. Cl.
CPC .. *G02F 1/133608* (2013.01); *G02F 1/133317* (2021.01); *G02F 1/133325* (2021.01)

(58) Field of Classification Search
CPC ......... G02F 1/133317; G02F 1/133608; G02F 1/133325; G02F 1/1333
(Continued)

(56) References Cited

U.S. PATENT DOCUMENTS 6,020,062 A * 2/2000 Questel ..................... C09J 7/38
428/354
2011/0242743 A1 10/2011 Moon
(Continued)

FOREIGN PATENT DOCUMENTS

CN 101840083 A 9/2010
CN 102312913 A 1/2012
(Continued)

OTHER PUBLICATIONS

Chinese Office Action for Chinese Application No. CN 201710151394.4 dated Jun. 22, 2018.
(Continued)

*Primary Examiner* — Karabi Guharay
(74) *Attorney, Agent, or Firm* — Fay Sharpe LLP

(57) ABSTRACT

A backlight module, display apparatus and method for manufacturing the display apparatus are provided. The backlight module includes: a positioning frame and a buffer adhesive tape. A display panel is arranged on a bearing platform of the positioning frame, and distance from a platform surface in an inner region of the bearing platform to the display panel is greater than distance from a platform surface in an edge region of the bearing platform to the display panel. The buffer adhesive tape is arranged on the bearing platform, a side of the buffer adhesive tape in the inner region is in contact with the display panel and the other
(Continued)

side thereof is attached to the platform surface, a back adhesive is arranged on the side of the buffer adhesive tape attached to the platform surface of the bearing platform. The backlight module improves the display effect of the black-state pictures.

18 Claims, 19 Drawing Sheets

(58) Field of Classification Search
USPC .......................................................... 362/97.1
See application file for complete search history.

(56) References Cited

U.S. PATENT DOCUMENTS

| | | |
|---|---|---|
| 2015/0116631 A1 | 4/2015 | Kim et al. |
| 2015/0355484 A1* | 12/2015 | Guo ..................... G02B 6/0088 349/62 |
| 2019/0271875 A1* | 9/2019 | Xu ..................... G02F 1/133308 |

FOREIGN PATENT DOCUMENTS

| | | |
|---|---|---|
| CN | 203705745 U | 7/2014 |
| CN | 104597633 A | 5/2015 |
| CN | 106773326 A | 5/2017 |

OTHER PUBLICATIONS

Chinese Office Action for Chinese Application No. CN 201710151394.4 dated Oct. 25, 2018.
International Search Report for PCT Application No. PCT/CN2018/075629 dated May 11, 2018.

* cited by examiner

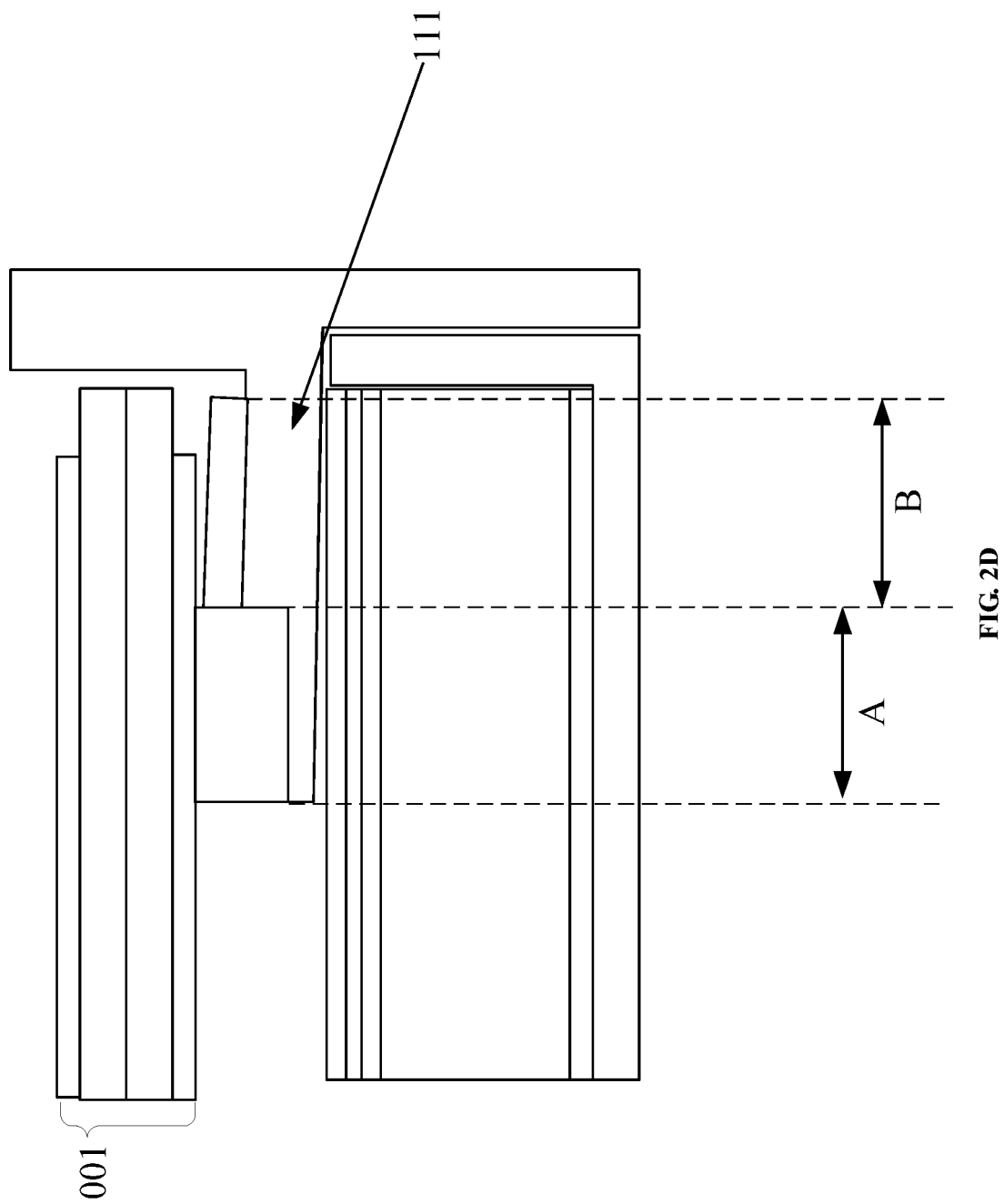

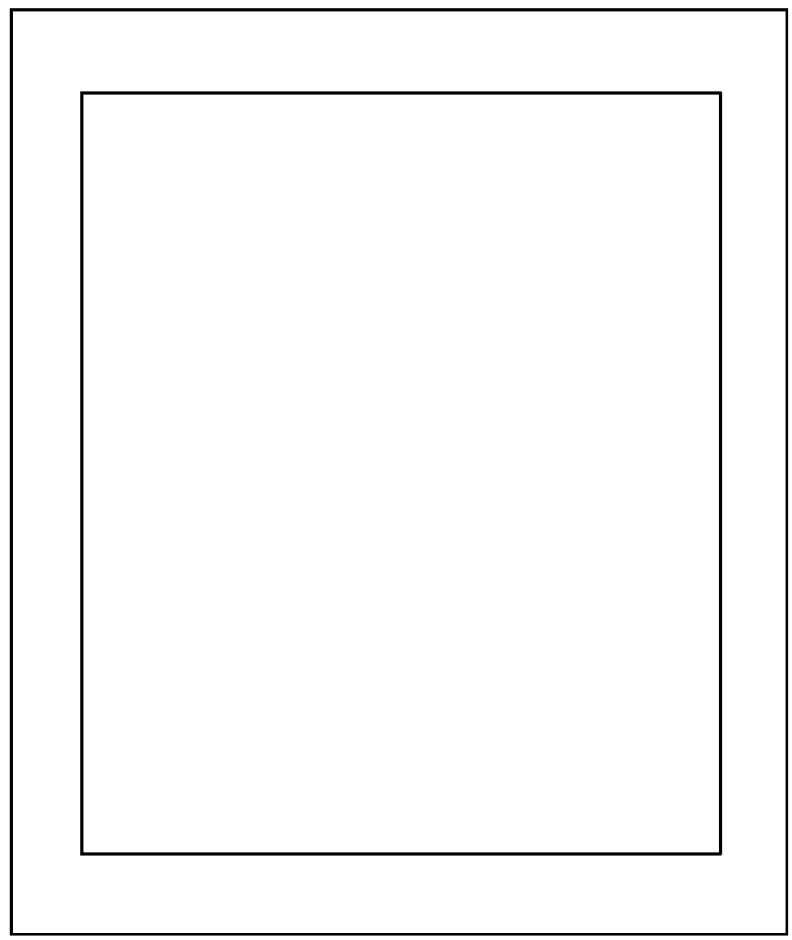

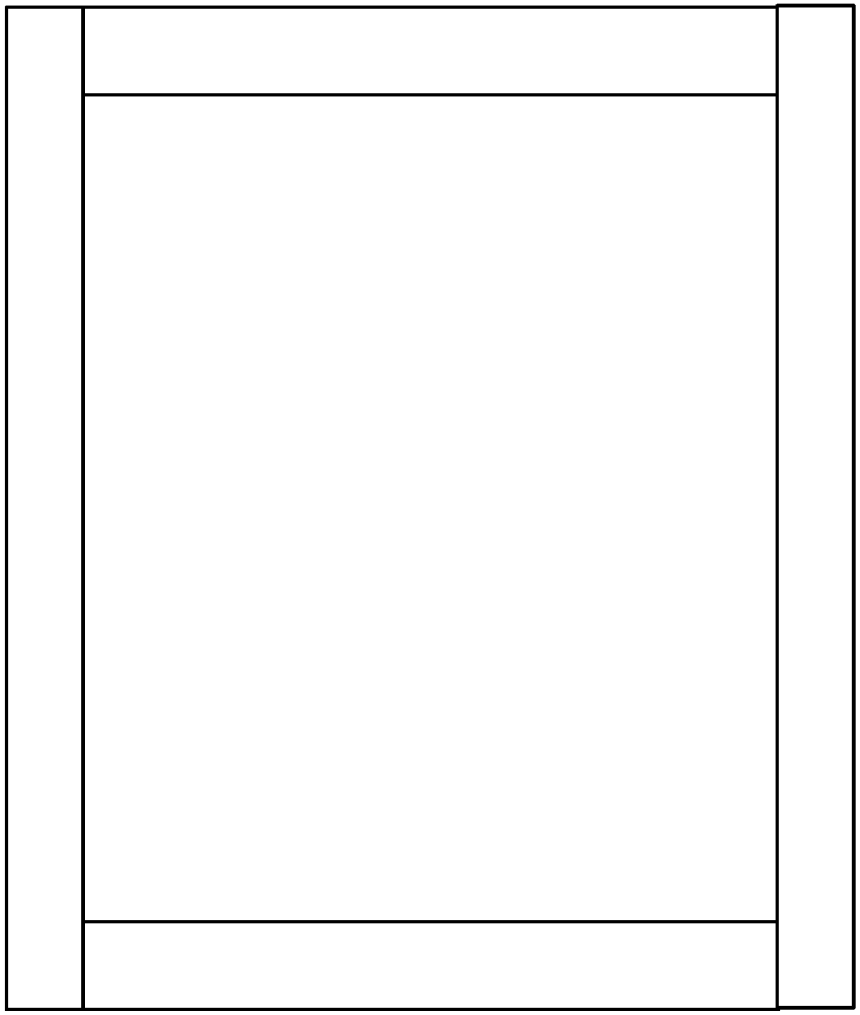

BACKLIGHT MODULE, DISPLAY APPARATUS AND METHOD FOR MANUFACTURING DISPLAY APPARATUS

This application is a 371 of PCT Patent Application Serial No. PCT/CN2018/075629, filed on Feb. 7, 2018, which claims priority to Chinese Patent Application No. 201710151394.4, filed with the State Intellectual Property Application No. 201710151394.4, filed with the State Intellectual Property Office on Mar. 14, 2017 and titled "BACKLIGHT MODULE, DISPLAY APPARATUS AND METHOD FOR MANUFACTURING DISPLAY APPARATUS", the entire contents of which are incorporated herein by reference.

TECHNICAL FIELD

The present disclosure relates to a backlight module, a display apparatus and method for manufacturing the display apparatus.

BACKGROUND

Liquid crystal displays (LCDs) are extensively used in mobile display, consumer communications, electronic products and the like fields owing to its good picture quality, thinness, low power consumption and the like advantages.

In the related art, a liquid crystal display includes a liquid crystal display panel and a backlight module. The liquid crystal display panel and the backlight module are oppositely arranged. The backlight module is used to supply a light source for an effective display region of the liquid crystal display panel. The liquid crystal display panel includes a thin film transistor (TFT) substrate. The TFT substrate is arranged on a bearing platform of an adhesive frame of the backlight module. The bearing platform is arranged in a peripheral region of the backlight module. A buffer adhesive tape is arranged between the TFT substrate and the bearing platform of the adhesive frame. The buffer adhesive tape is used to buffer the TFT substrate when the bearing platform is not flat (for example, the bearing platform itself is deformed, or the bearing platform is warped and deformed when the adhesive frame of the backlight module is engaged with a back plate).

Since the buffer adhesive tape has uniform and small thickness, when the flatness of the bearing platform of the adhesive frame is poor, the liquid crystal display panel may suffer a stress on the buffer adhesive tape, resulting in a non-uniform brightness of the liquid crystal display, as well as poor display effect of black-state pictures (i.e., L0 pictures).

SUMMARY

There are provided in the present disclosure a backlight module, a display apparatus and a method for manufacturing the display apparatus.

In a first aspect, there is provided a backlight module, including: a positioning frame and a buffer adhesive tape; where a display panel is arranged on a bearing platform of the positioning frame, and a distance from a platform surface in an inner region of the bearing platform to the display panel is greater than a distance from a platform surface in an edge region of the bearing platform to the display panel; and the buffer adhesive tape is arranged on the bearing platform, a side of the buffer adhesive tape in the inner region is in contact with the display panel and the other side of the buffer adhesive tape is attached to the platform surface, and a back adhesive is arranged on the side, which is attached to the platform surface of the bearing platform, of the buffer adhesive tape.

Optionally, the positioning frame is an adhesive frame; where a bearing platform of the adhesive frame has a step shape, and a thickness of a first portion of the inner region of the bearing platform is less than a thickness of a second portion of the edge region of the bearing platform.

Optionally, the positioning frame is a middle iron frame; where a bearing platform of the middle iron frame has a folded-line shape, and a thickness of a first portion of the inner region of the bearing platform is equal to a thickness of a second portion of the edge region of the bearing platform.

Optionally, the back adhesive is arranged on the side, which is attached to the platform surface of the bearing platform, of the buffer adhesive tape in the inner region.

Optionally, a gap is existed between at least one of the display panel and the platform surface of the edge region of the bearing platform and the buffer adhesive tape in the edge region.

Optionally, the buffer adhesive tape includes a first sub-buffer adhesive tape and a second sub-buffer adhesive tape; where a thickness of the first sub-buffer adhesive tape is greater than a thickness of the second sub-buffer adhesive tape, the first sub-buffer adhesive tape is attached to the first portion, and a gap is existed between at least one of the second portion and the display panel and the second sub-buffer adhesive tape.

Optionally, the buffer adhesive tape is an integral hollow-square-shaped structure or is defined by enclosure of four adhesive tape strips.

Optionally, the buffer adhesive tape is made of an elastic material.

Optionally, the buffer adhesive tape is a foam adhesive tape.

In a second aspect, there is provided a display apparatus, including a backlight module; where the backlight module includes: a positioning frame and a buffer adhesive tape; where a display panel is arranged on a bearing platform of the positioning frame, a distance from a platform surface in an inner region of the bearing platform to the display panel is greater than a distance from a platform surface in an edge region of the bearing platform to the display panel; and the buffer adhesive tape is arranged on the bearing platform, a side of the buffer adhesive tape in the inner region is in contact with the display panel and the other side of the buffer adhesive tape is attached to the platform surface, and a back adhesive is arranged on the side of the buffer adhesive tape that is attached to the platform surface of the bearing platform.

Optionally, the positioning frame is an adhesive frame; where a bearing platform of the adhesive frame has a step shape, and a thickness of a first portion of the inner region of the bearing platform is less than a thickness of a second portion of the edge region of the bearing platform.

Optionally, the positioning frame is a middle iron frame; where a bearing platform of the middle iron frame has a folded-line shape, a thickness of a first portion of the inner region of the bearing platform is equal to a thickness of a second portion of the edge region of the bearing platform.

Optionally, the back adhesive is arranged on the side, which is attached to the platform surface of the bearing platform, of the buffer adhesive tape in the inner region.

Optionally, a gap is existed between at least one of the display panel and the platform surface of the edge region of the bearing platform and the buffer adhesive tape in the edge region.

Optionally, the buffer adhesive tape includes a first sub-buffer adhesive tape and a second sub-buffer adhesive tape; where a thickness of the first sub-buffer adhesive tape is greater than a thickness of the second sub-buffer adhesive tape, the first sub-buffer adhesive tape is attached to the first portion, and a gap is existed between at least one of the second portion and the display panel and the second sub-buffer adhesive tape.

Optionally, the buffer adhesive tape is an integral hollow-square-shaped structure or is defined by enclosure of four adhesive tape strips.

Optionally, the buffer adhesive tape is made of an elastic material.

Optionally, the buffer adhesive tape is a foam adhesive tape.

In a third aspect, there is provided a method for manufacturing a display apparatus, including steps of: arranging a buffer adhesive tape on a bearing platform of a positioning frame, such that a side of the buffer adhesive tape in an inner region of the bearing platform is attached to a platform surface of the bearing platform; and arranging a display panel on a backlight module, such that the display panel is in contact with the other side of the buffer adhesive tape in the inner region of the bearing platform, the backlight module being the backlight module as mentioned above.

BRIEF DESCRIPTION OF THE DRAWINGS

FIG. 2D is a schematic view of a buffer adhesive tape when a bearing platform is warped according to an embodiment of the present disclosure;

FIG. 5A is a top view of a buffer adhesive tape provided by an embodiment of the present disclosure;

FIG. 5B is a top view of another buffer adhesive tape provided by an embodiment of the present disclosure;

DETAILED DESCRIPTION

The present disclosure is described in further detail with reference to the accompanying drawings, to clearly present the principles and advantages of the present disclosure.

Figure 1A:
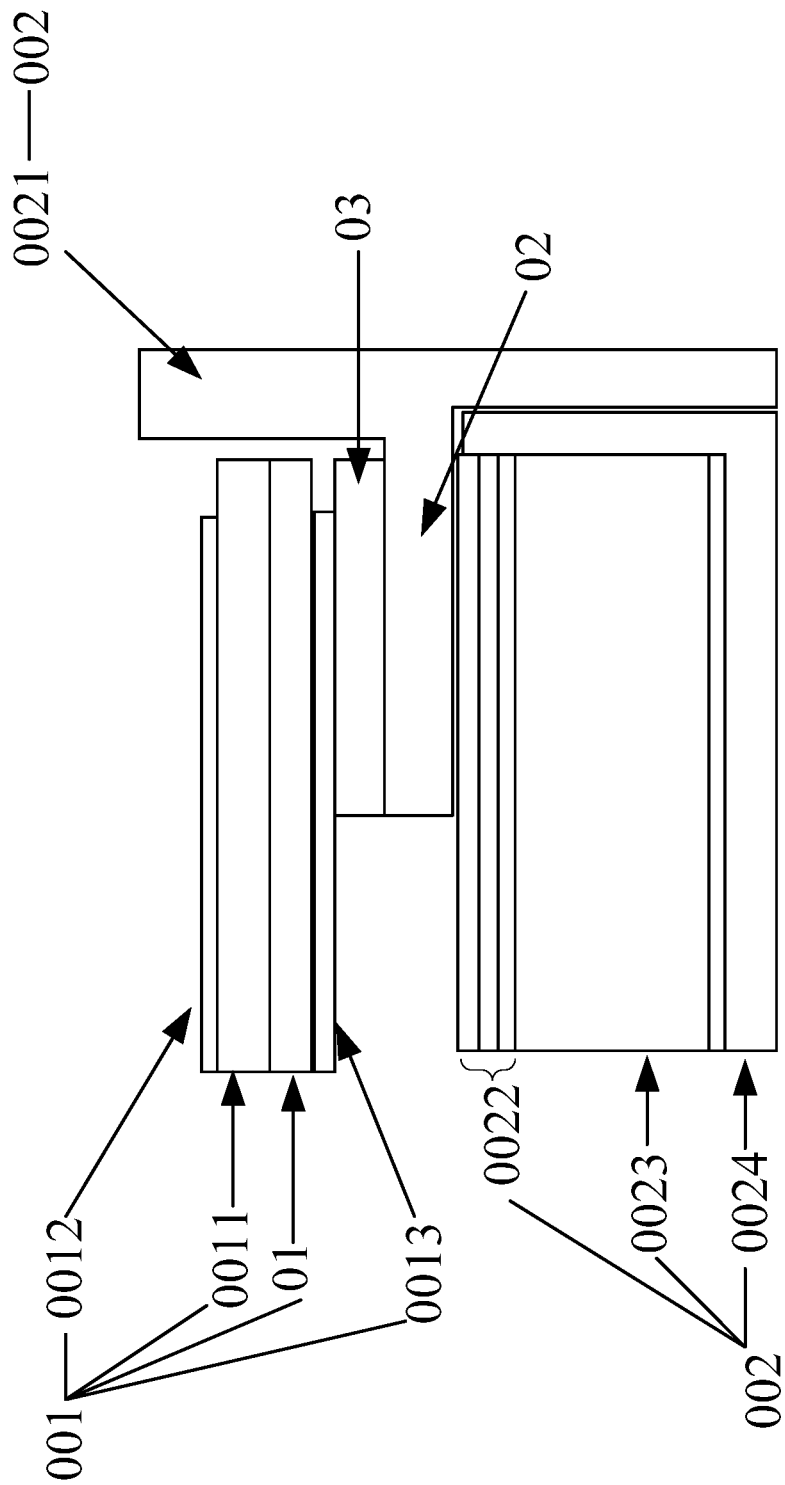
FIG. 1A is a schematic view of a structure of a liquid crystal display in an embodiment of the present disclosure.

FIG. 1A is a schematic view of a structure of a liquid crystal display. As illustrated in FIG. 1A, the liquid crystal display includes a liquid crystal display panel 001 and a backlight module 002. The liquid crystal display panel 001 and the backlight module 002 are oppositely arranged, where the liquid crystal display panel 001 includes a TFT substrate 01, a color film substrate 0011, an upper polarizer 0012 and a lower polarizer 0013. The backlight module 002 includes an adhesive frame 0021, an optical film 0022, a light guide plate 0023 and a back plate 0024. The optical film includes a diffusion film and a prism film.

The TFT substrate 01 of the liquid crystal display panel 001 is arranged on a bearing platform 02 of the adhesive frame 0021 of the backlight module 002, and a buffer adhesive tape 03 is arranged between the TFT substrate 01 and the bearing platform 02 of the adhesive frame. The buffer adhesive tape 03 is used to buffer the TFT substrate 01 when the bearing platform 02 is not flat (for example, the bearing platform itself is deformed, or the bearing state is warped and deformed when the adhesive frame of the backlight module is engaged with the back plate). However, the buffer adhesive tape 03 has a uniform but small thickness, leading to a small buffering capacity and poor buffer performance of the buffer adhesive tape 03. In addition, the liquid crystal display panel 001 is easily subject to the flatness of the bearing platform 02 of the adhesive frame. Therefore, when the flatness of the bearing platform 02 of the adhesive frame is poor, the liquid crystal display panel 001 can suffer from a stress on the buffer adhesive tape 03, resulting in a non-uniform luminance of the liquid crystal display, as well as a poor display effect of black-state pictures.

Figure 1B:
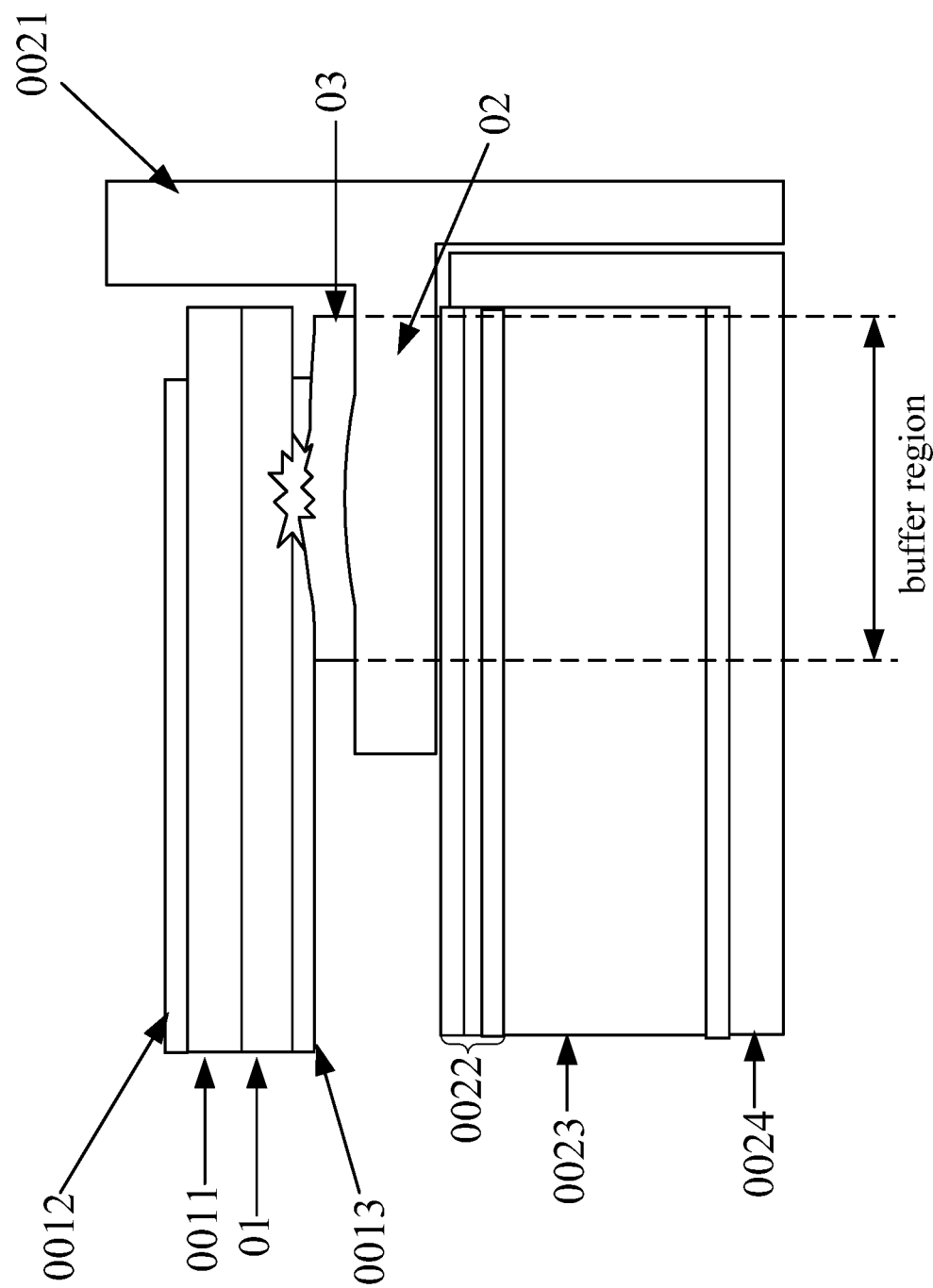
FIG. 1B is a schematic view illustrating a scenario where the liquid crystal display panel suffers from a stress on a buffer adhesive tape in an embodiment of the present disclosure.

FIG. 1B is a schematic view illustrating a scenario where the liquid crystal display panel suffers from a stress on a buffer adhesive tape 03, when the bearing platform 02 in FIG. 1A is deformed. When the bearing platform 02 is deformed, the buffer adhesive tape 03 is also deformed. Since the buffer adhesive tape 03 has a uniform but small thickness, when the deformation of the bearing platform is greater than a compression of the buffer adhesive tape, the bearing platform can transfer a non-uniform stress to the liquid crystal display panel via the buffer adhesive tape, such that the liquid crystal display panel suffers the stress in the buffer region, resulting in a non-uniform luminance of the liquid crystal display, as well as a poor display effect of black-state pictures. The other reference signs in FIG. 1B can be referenced to FIG. 1A.

Figure 1C:
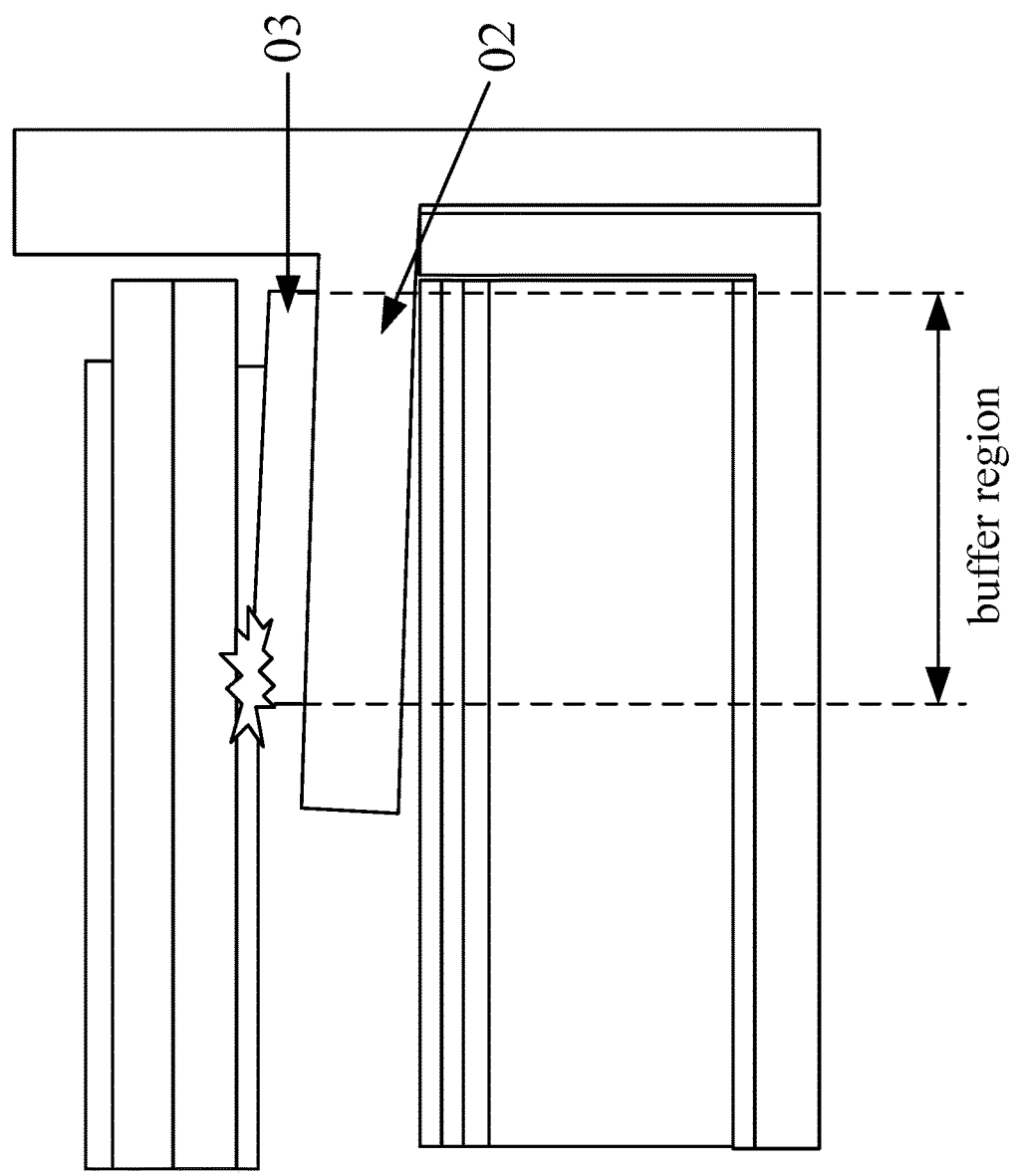
FIG. 1C is a schematic view illustrating a scenario where the liquid crystal display panel suffers from a stress on a buffer adhesive tape in an embodiment of the present disclosure.

FIG. 1C is a schematic view illustrating a scenario where the liquid crystal display panel suffers from a stress on the buffer adhesive tape 03, when the bearing platform 02 in FIG. 1A is warped and deformed. When the bearing platform 02 is warped and deformed, the buffer adhesive tape 03 is also warped and deformed. Since the buffer adhesive tape 03 has a uniform but small thickness, when the deformation of the bearing platform is greater than a compression of the buffer adhesive tape, the bearing platform can transfer a non-uniform stress to the liquid crystal display panel via the buffer adhesive tape, such that the liquid crystal display panel suffers the stress in the buffer region, resulting in a poor display effect of black-state pictures. In practice, the bearing platform can also drop down in addition to the warping deformation, which exerts a tension to the liquid crystal display panel, and also reduces the display effect of the black-state pictures.

As seen from FIG. 1B and FIG. 1C, when the flatness of the bearing platform of the adhesive frame is poor, the buffer adhesive tape can fail to better buffer the liquid crystal display panel.

Figure 1D:
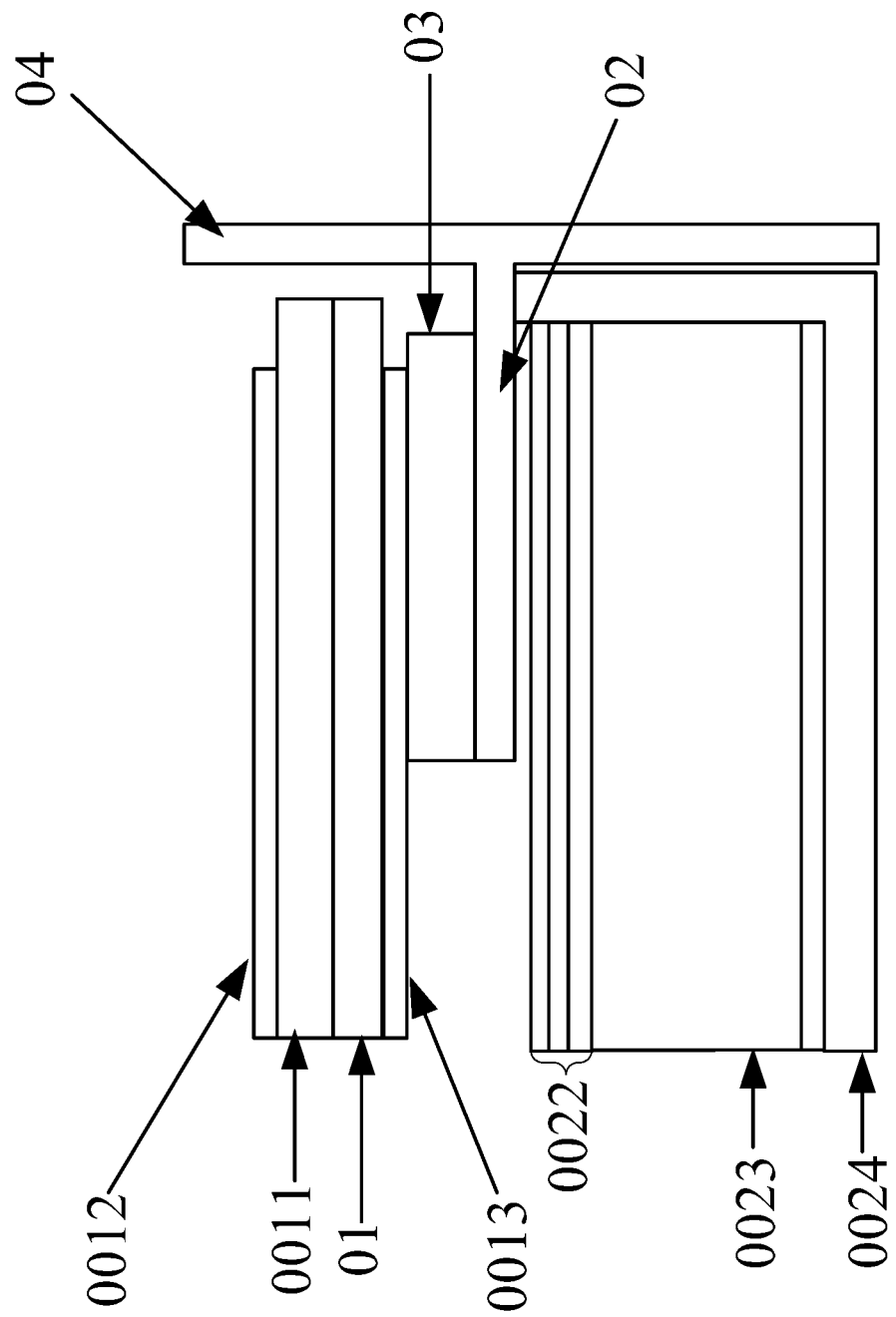
FIG. 1D is a schematic view of a structure of another liquid crystal display in an embodiment of the present disclosure.

In addition, as illustrated in FIG. 1D, a middle iron frame (the middle iron frame refers to an iron frame disposed in the liquid crystal display) 04 can also be employed to replace the adhesive frame 0021 in FIG. 1A. The other reference signs in FIG. 1D can be referenced to FIG. 1A.

Figure 2A:
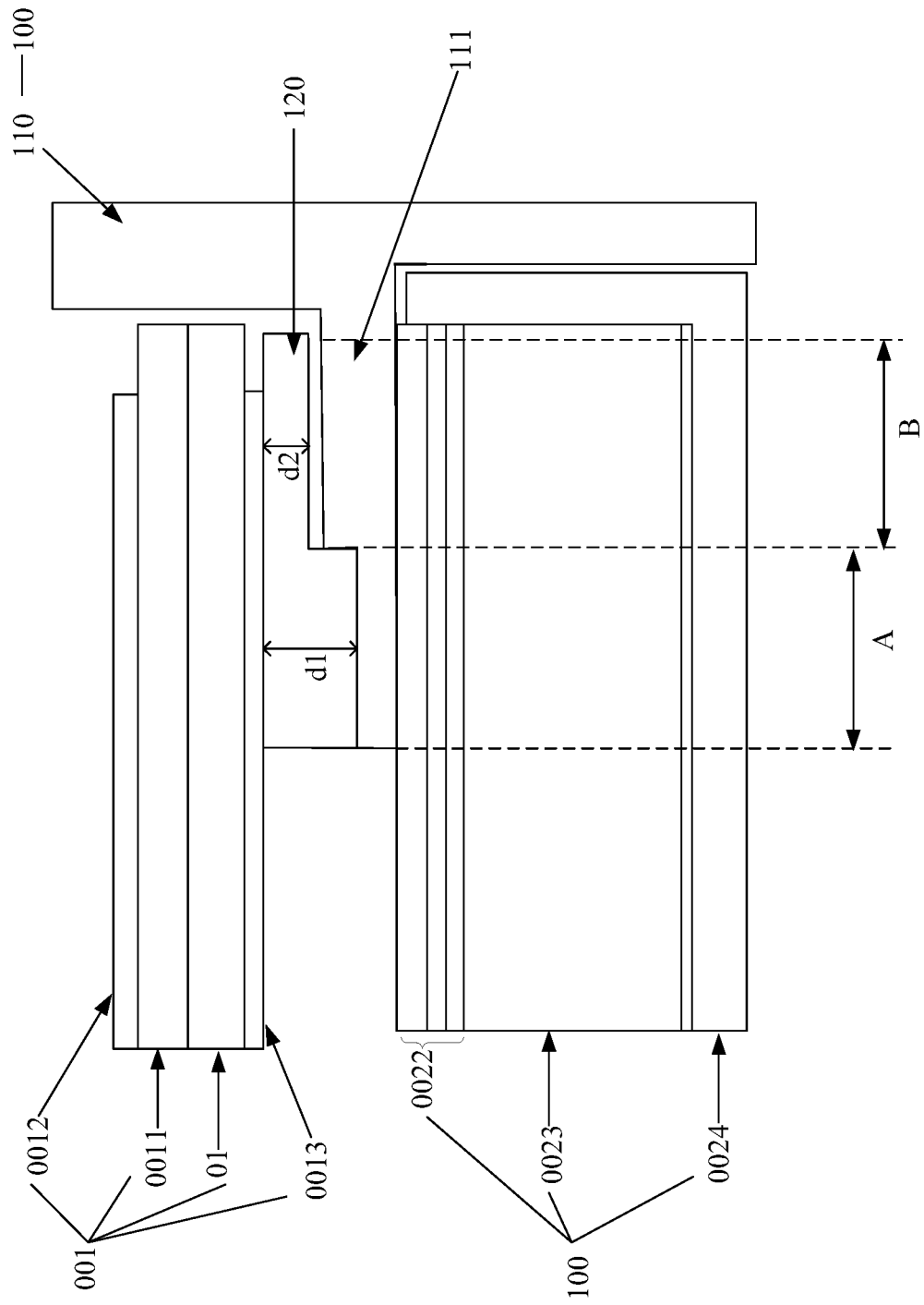
FIG. 2A is a schematic view of a structure of a display apparatus including a backlight module provided by an embodiment of the present disclosure.

There is provided in the embodiments of the present disclosure a backlight module 100. As shown in FIG. 2A, the backlight module 100 includes: a positioning frame 110 and a buffer adhesive tape 120.

A display panel 001 is arranged on a bearing platform 111 of the positioning frame 110, and a distance d1 from a platform surface in an inner region A of the bearing platform 111 to the display panel 001 is greater than a distance d2 from a platform surface in an edge region B of the bearing platform 111 to the display panel 001.

The buffer adhesive tape 120 is arranged on the bearing platform 111, a side of the buffer adhesive tape in the inner region A is in contact with the display panel 001 and the other side of the buffer adhesive tape is attached to the platform surface of the bearing platform 111. A back adhesive (not shown in FIG. 2A) is arranged on the side of the buffer adhesive tape 120 that is attached to the platform surface of the bearing platform 111. The back adhesive plays a part in securing the buffer adhesive tape. The buffer adhesive tape cooperates with the positioning frame, so as to be used in a peripheral region of the backlight module. Herein, the positioning frame plays a part in positioning and supporting.

In summary, in the backlight module provided by the embodiments of the present disclosure, since the distance from the platform surface in the inner region of the bearing platform of the positioning frame to the display panel is greater than the distance from the platform surface in the edge region of the bearing platform to the display panel, a side of the buffer adhesive tape in the inner region is in contact with the display panel and the other side of the buffer adhesive tape is attached to the platform surface, and the buffer adhesive tape in the inner region has a great thickness, thus when the flatness of the bearing platform is poor, the display panel can be prevented from suffering a stress on the buffer adhesive tape, such that the display has a more uniform luminance, thereby improving the display effect of the black-state pictures.

In the embodiments of the present disclosure, the buffer adhesive tape in the edge region B of the bearing platform is in contact with the display panel and the platform surface in the edge region of the bearing platform in the following four contact ways: first, a side of the buffer adhesive tape in the edge region B is in contact with the display panel, and a gap is existed between the other side of the buffer adhesive tape and the platform surface of the bearing platform; second, a gap is existed between a side of the buffer adhesive tape in the edge region B and the display panel, and the other side of the buffer adhesive tape is attached to the platform surface of the bearing platform; third, a gap is existed between a side of the buffer adhesive tape in the edge region B and the display panel, and a gap is existed between the other side of the buffer adhesive tape and the platform surface of the bearing platform; four, a side of the buffer adhesive tape in the edge region B is in contact with the display panel, and the other side of the buffer adhesive tape is attached to the platform surface of the bearing platform.

To secure the buffer adhesive tape, when a gap is existed between the other side of the buffer adhesive tape in the edge region B of the bearing platform and the platform surface of the bearing platform, a back adhesive needs to be provided on the side where the buffer adhesive tape in the inner region A of the bearing platform is attached to the platform surface of the bearing platform; and when the other side of the buffer adhesive tape in the edge region B is attached to the platform surface of the bearing platform and this side is provided with a back adhesive, the side where the buffer adhesive tape in the inner region A is attached to the platform surface of the bearing surface can be provided with a back adhesive or can be provided without back adhesive.

In the first to third contact ways mentioned above, since a gap is existed between at least one of the display panel and the platform surface in the edge region of the bearing platform and the buffer adhesive tape in the edge region, when the bearing platform is deformed, if the buffer adhesive tape in the edge region B of the bearing platform is deformed, the deformed buffer adhesive tape can be filled in the gap; and when the deformation of the buffer adhesive tape in the edge region B is too large, the buffer adhesive tape in the edge region B can achieve the buffer effect. This prevents the bearing platform from transferring a non-uniform stress to the display panel via the buffer adhesive tape. If the buffer adhesive tape in the inner region A of the bearing platform is deformed, since the buffer adhesive tape in the inner region A has a great thickness, a great buffering capacity and good buffer performance, the deformation of the bearing platform can be offset by the buffer adhesive tape in the inner region A.

In the fourth contact way, the buffer adhesive tape in the inner region A of the bearing platform has a great thickness, a great buffering capacity and good buffer performance, thus the buffer adhesive tape can function as a main buffer (that is, plays a main buffering role), whereas the buffer adhesive tape in the edge region B of the bearing platform has a small thickness, thus can function as an auxiliary buffer. When the bearing platform of the positioning frame is warped and deformed, the display panel can be firstly buffered on the buffer adhesive tape in the inner region, and then buffered on the buffer adhesive tape in the edge region. In addition, when the buffer adhesive tape in the inner region has a too large deformation, the buffer adhesive tape in the edge region can function as the auxiliary buffer, thereby preventing the bearing platform from transferring a non-uniform stress to the display panel via the buffer adhesive tape.

In the embodiments of the present disclosure, since the buffer adhesive tape in the edge region B of the bearing platform can be in contact with the display panel and the platform surface of the edge region of the bearing platform in four ways, the buffer adhesive tape can have multiple structures.

FIG. 2A shows exemplarily a schematic view of the buffer adhesive tape applying the first contact way in the above four contact ways, that is, a schematic view of a buffer adhesive tape when a side of the buffer adhesive tape in the edge region B of the bearing platform is in contact with the display panel 001, and a gap is existed between the other side of the buffer adhesive tape and the platform surface of the bearing platform 111. As illustrated in FIG. 2A, a back adhesive is arranged on the side where the buffer adhesive tape in the inner region A of the bearing platform is attached to the platform surface of the bearing platform. To further secure the buffer adhesive tape, a back adhesive can be arranged on the side where the buffer adhesive tape in the edge region B of the bearing platform is in contact with the display panel, and a back adhesive can be arranged on the side where the buffer adhesive tape in the inner region A of the bearing platform is in contact with the display panel.

Further, referring to FIG. 2A, the display panel 001 further includes a color film substrate 0011, an upper polarizer 0012 and a lower polarizer 0013. The color film substrate 0011 and the TFT substrate 01 are oppositely arranged, a liquid crystal layer is arranged between the color film substrate 0011 and the TFT substrate 01, the upper polarizer 0012 is arranged on a side of the color film substrate 0011 that is away from the TFT substrate 01, and the lower polarizer 0013 is arranged on the side of the TFT substrate 01 that is away from the color film substrate 0011. The backlight module 100 further includes a back plate 0024. The back plate 0024 is provided with a light guide plate 0023, and the light guide plate is used to uniformly guide a light beam emitted by a light source to a direction away from the back plate. The light guide plate 0023 is provided with an optical film 0022, and the optical film is used to change the direction of the light emitted from the light guide plate, and enhance the intensity of the emitted light. Exemplarily, the optical film can include an upper diffusion film, a prism film and a lower diffusion film.

Figure 2B:
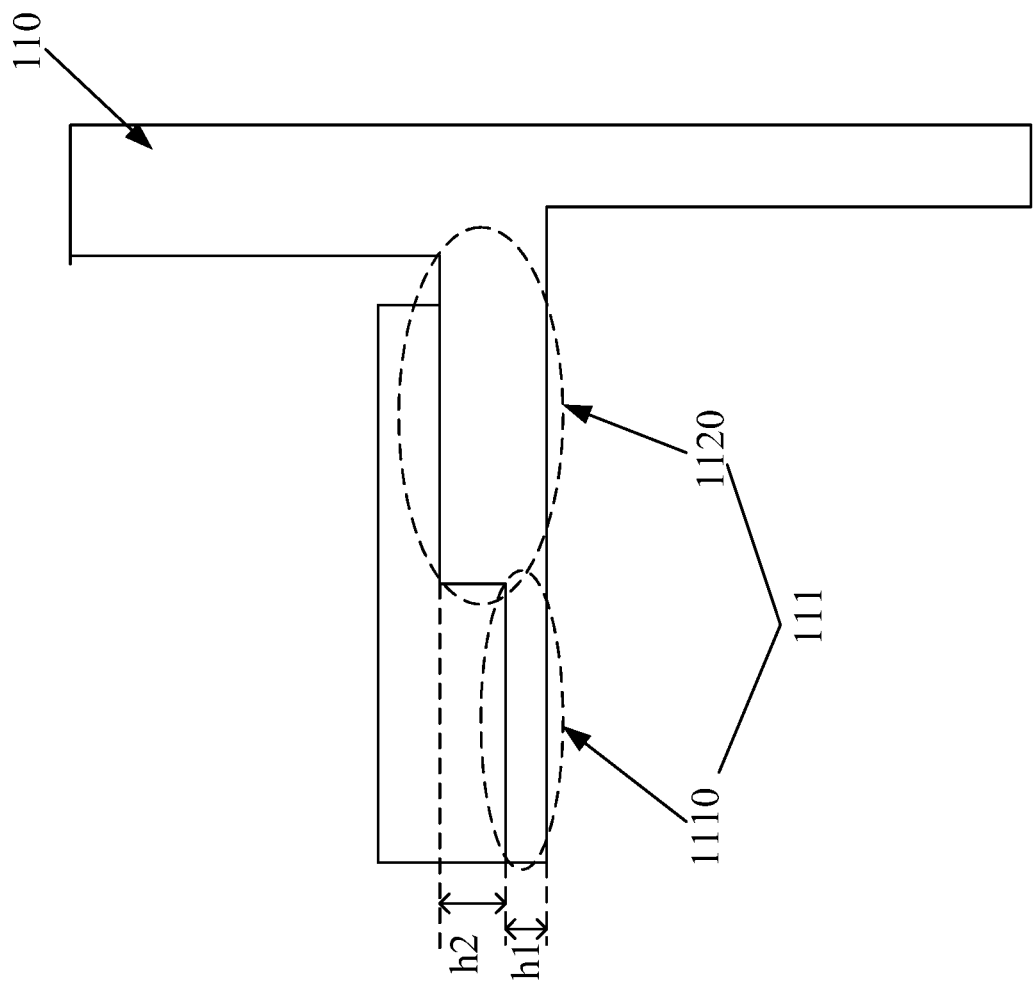
FIG. 2B is a schematic view illustrating a scenario where a bearing platform of an adhesive frame is used in combination with a buffer adhesive tape according to an embodiment of the present disclosure.

Exemplarily, as illustrated in FIG. 2A, the positioning frame 110 can be an adhesive frame, and the bearing platform 111 of the adhesive frame can be in a step shape. As illustrated in FIG. 2B, a first portion 1110 in the inner region of the bearing platform 111 has a thickness h1 that is less than a thickness h2 of a second portion 1120 in the edge region of the bearing platform 111. The thickness of the first portion of the bearing platform is less than the thickness of the second portion of the bearing platform, and the buffer adhesive tape in the inner region of the bearing platform has a great thickness. Therefore, the buffer adhesive tape in the inner region has a great buffering capacity and good buffer performance. In the meantime, when the thickness of the first portion of the bearing platform is less than the thickness of the second portion of the bearing platform, the deformation of the bearing platform can also be reduced.

Figure 2C:
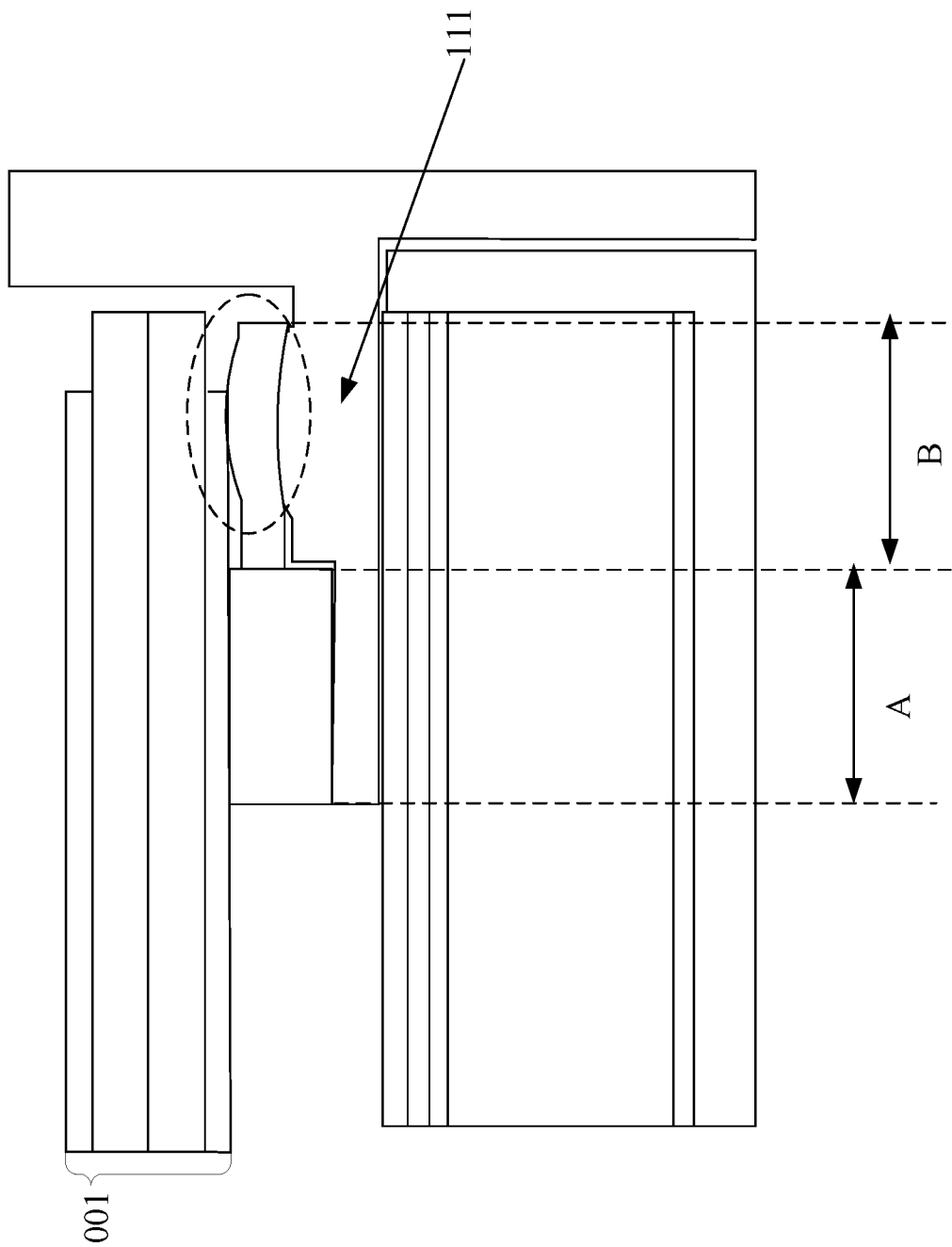
FIG. 2C is a schematic view of a buffer adhesive tape when a bearing platform is deformed according to an embodiment of the present disclosure.

FIG. 2C shows exemplarily a schematic view of the buffer adhesive tape applying the third contact way in the above four contact ways, that is, a schematic view of the buffer adhesive tape when a gap is existed between a side of the buffer adhesive tape in the edge region B of the bearing platform and the display panel 001, and a gap is existed between the other side of the buffer adhesive tape and the platform surface of the bearing platform 111.

As illustrated in FIG. 2C, a back adhesive is arranged on the side where the buffer adhesive tape in the inner region A of the bearing platform is attached to the platform surface of the bearing platform. To further secure the buffer adhesive tape, a back adhesive can be arranged in the side where the buffer adhesive tape in the inner region A of the bearing platform is in contact with the display panel.

As illustrated in FIG. 2C, the buffer adhesive tape in the inner region A of the bearing platform has a great thickness, and thus the buffer adhesive tape in the inner region has good buffer performance and functions as a primary buffer; and the buffer adhesive tape in the edge region B has a small thickness, and thus functions as an auxiliary buffer. The buffer adhesive tape in the edge region can bear an external stress, and thus has a great bearing strength. Since a gap is existed between a side of the buffer adhesive tape in the edge region B and the display panel, and a gap is existed between the other side of the buffer adhesive tape and the platform surface of the bearing platform, when the edge region B of the bearing platform 111 is deformed, the buffer adhesive tape in the edge region B is deformed, and the deformed buffer adhesive tape is filled in the gap, as illustrated in the region marked by the dotted lines in FIG. 2C. When the deformation of the buffer adhesive tape in the edge region B is too large, the buffer adhesive tape in the edge region B can be compressed, and thus functions as the auxiliary buffer, thereby reducing the risk of exerting an action force by the deformation of the edge region B of the bearing platform to the display panel, preventing the bearing platform from transferring a non-uniform stress to the display panel via the buffer adhesive tape, improving uniformity of the luminance of the display and improving the display effect of black-state pictures.

In addition, when the inner region A of the bearing platform is deformed, the buffer adhesive tape in the inner region A has a greater thickness compared with the thickness of the bearing platform in the related art, and thus the buffering capacity can be greatly increased, and the deformation of the bearing platform can be offset by the buffer adhesive tape in the inner region, thereby preventing the bearing platform from transferring a stress to the display panel via the buffer adhesive tape.

FIG. 2D shows exemplarily a schematic view of the buffer adhesive tape applying the second contact way in the above four contact ways, that is, a schematic view of the buffer adhesive tape when a gap is existed between a side of the buffer adhesive tape in the edge region B of the bearing platform and the display panel 001, and the other side of the buffer adhesive tape is attached to the platform surface of the bearing platform 111. As illustrated in FIG. 2D, a back adhesive is provided on the side where the buffer adhesive tape in the inner region A of the bearing platform is attached to the platform surface of the bearing state, and/or a back adhesive is arranged on the side where the buffer adhesive tape in the edge region B of the bearing platform is attached to the platform surface of the bearing platform. To further secure the buffer adhesive tape, a back adhesive can be provided in the side where the buffer adhesive tape in the inner region A of the bearing platform is in contact with the display panel.

As illustrated in FIG. 2D, when the bearing platform 111 is warped and deformed, the display panel 001 can be firstly buffered by the buffer adhesive tape in the inner region A of the bearing platform, and then can be buffered by the buffer adhesive tape in the edge region B. Since the buffer adhesive tape in the inner region A has a great thickness, the buffering capacity can be greatly increased, thereby preventing the bearing platform from transferring a stress to the display panel via the buffer adhesive tape.

Exemplarily, the buffer adhesive tape can be made of an elastic material. The buffer adhesive tape in the inner region A of the bearing platform exerts no leverage to the buffer adhesive tape in the edge region B of the bearing platform. That is, the deformation of the buffer adhesive tape in the inner region A exerts no impact to the buffer adhesive tape in the edge region B.

Of course, in FIG. 2D, it also can be a side of the buffer adhesive tape in the edge region B is in contact with the display panel 001, and the other side of the buffer adhesive tape is attached to the platform surface of the bearing platform 111.

Figure 3A:
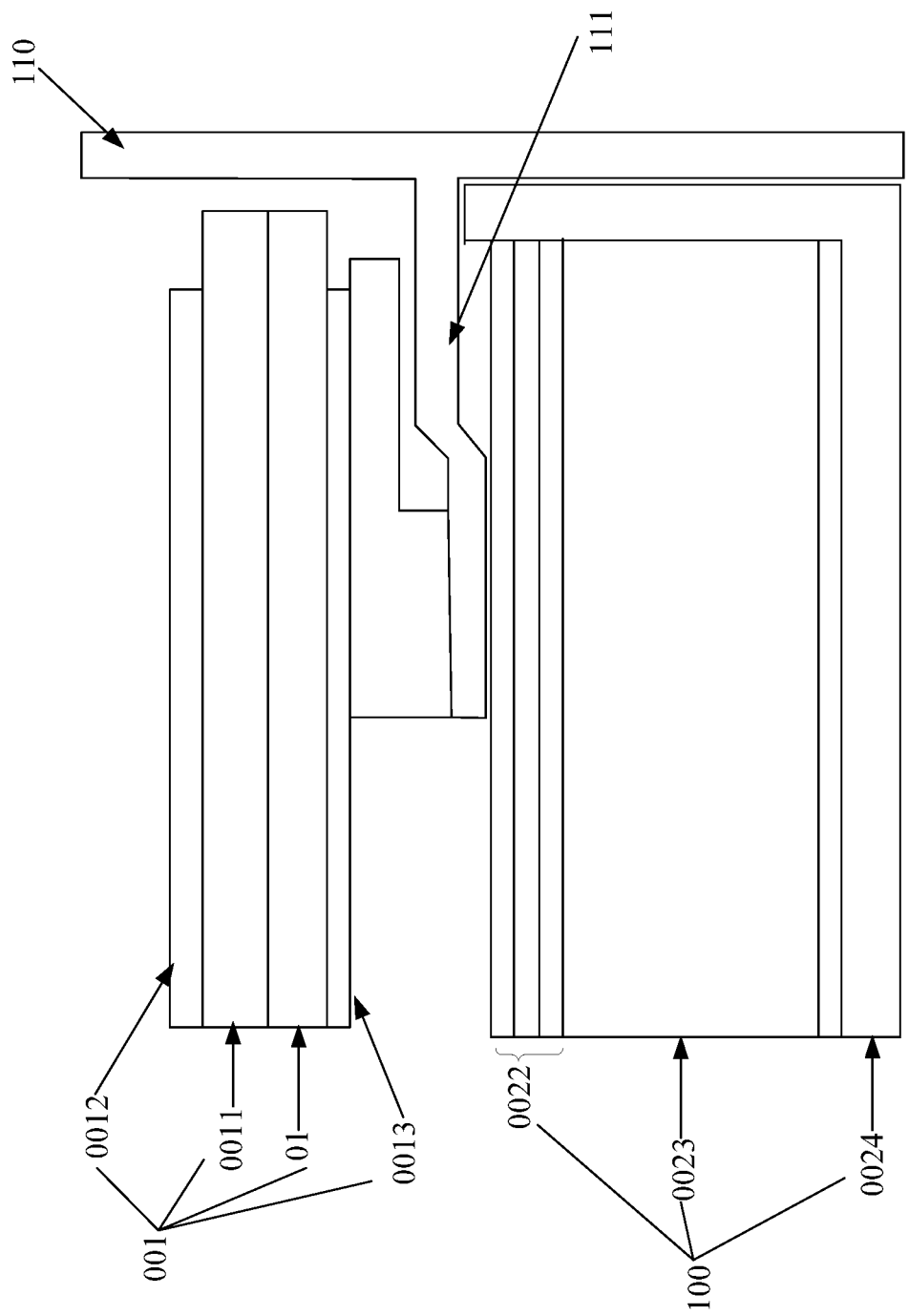
FIG. 3A is a schematic view of a structure of another display apparatus including a backlight module provided by an embodiment of the present disclosure.

Exemplarily, as illustrated in FIG. 3A, the positioning frame 110 can be a middle iron frame, and the bearing platform 111 of the middle iron frame has a folded-line shape. The other reference signs in FIG. 3A can be referenced to FIG. 2A.

Figure 3B:
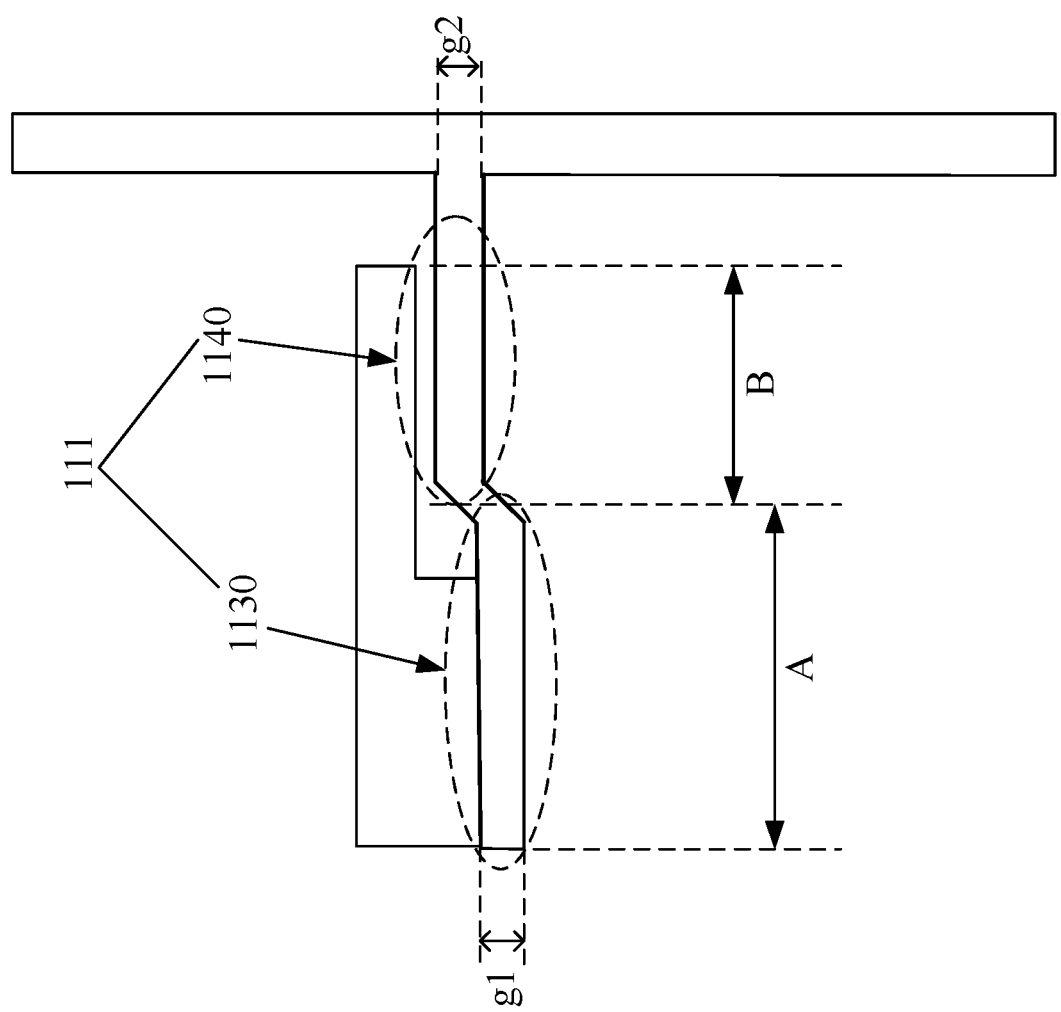
FIG. 3B is a schematic view illustrating a scenario where a bearing platform of a middle iron frame is used in combination with a buffer adhesive tape provided by an embodiment of the present disclosure.

Optionally, as illustrated in FIG. 3B, a thickness g1 of a first portion 1130 in the inner region A of the bearing platform 111 can be equal to a thickness g2 of a second portion 1140 in the edge region B of the bearing platform 111. Similarly, since the bearing platform 111 has a folded-line shape, the thickness of the first portion is equal to the thickness of the second portion, the first portion sinks, and the buffer adhesive tape in the inner region of the bearing platform has a great thickness. Therefore, the buffering capacity of the buffer adhesive tape in the inner region is great, and the buffer performance is good. In the practical manufacturing process, due to manufacturing errors, the thickness of the first portion of the inner region of the bearing platform can also be not equal to the thickness of the second portion in the edge region of the bearing platform. In the embodiments of the present disclosure, it is only required that the distance from the platform surface in the inner region of the bearing platform to the display panel is greater than the distance from the platform surface in the edge region of the bearing platform to the display panel.

Figure 4A:
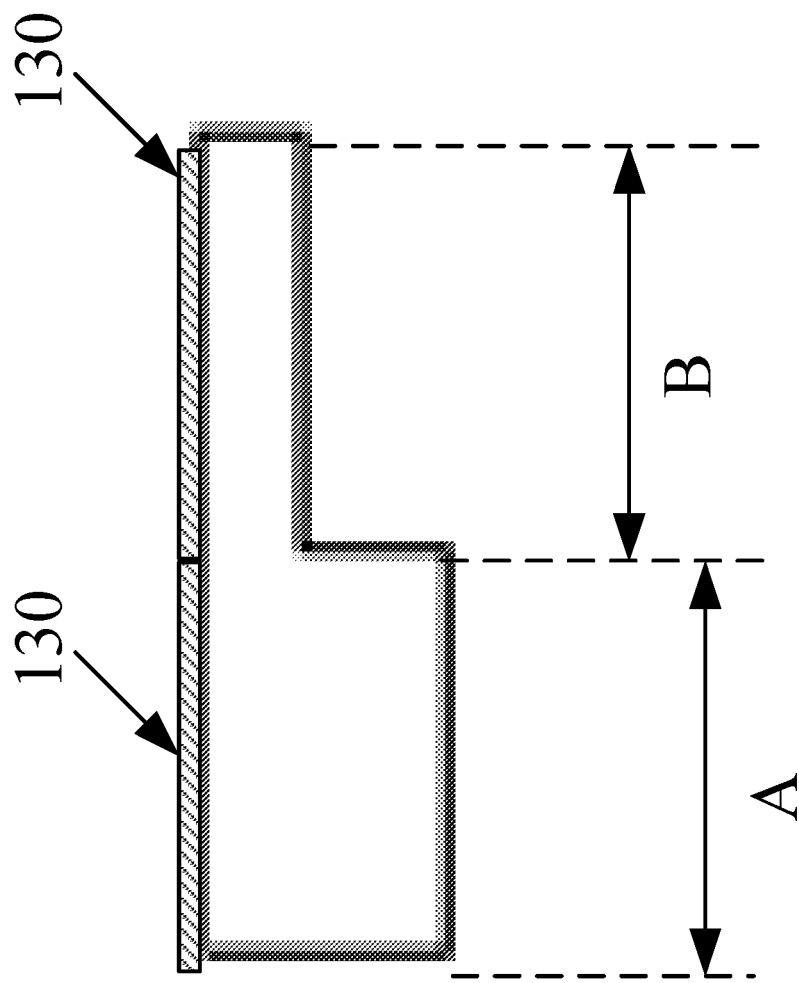
FIG. 4A is a schematic view of a structure of a buffer adhesive tape provided with a back adhesive provided by an embodiment of the present disclosure.

FIG. 4A shows exemplarily a schematic view of a structure of the buffer adhesive tape in FIG. 2A. As illustrated in FIG. 4A, to further secure the buffer adhesive tape, a back adhesive 130 can be arranged on the side where the buffer adhesive tape in the inner region A of the bearing platform is in contact with the display panel, and a back adhesive 130 can be arranged on the side where the buffer adhesive tape in the edge region B of the bearing platform is in contact with the display panel. The back adhesive increases the adhesion between the buffer adhesive tape and the display panel. Exemplarily, the buffer adhesive tape 120 can be made of a silica gel, a high-temperature-resistant foam or the like material without slag-drop.

Figure 4B:
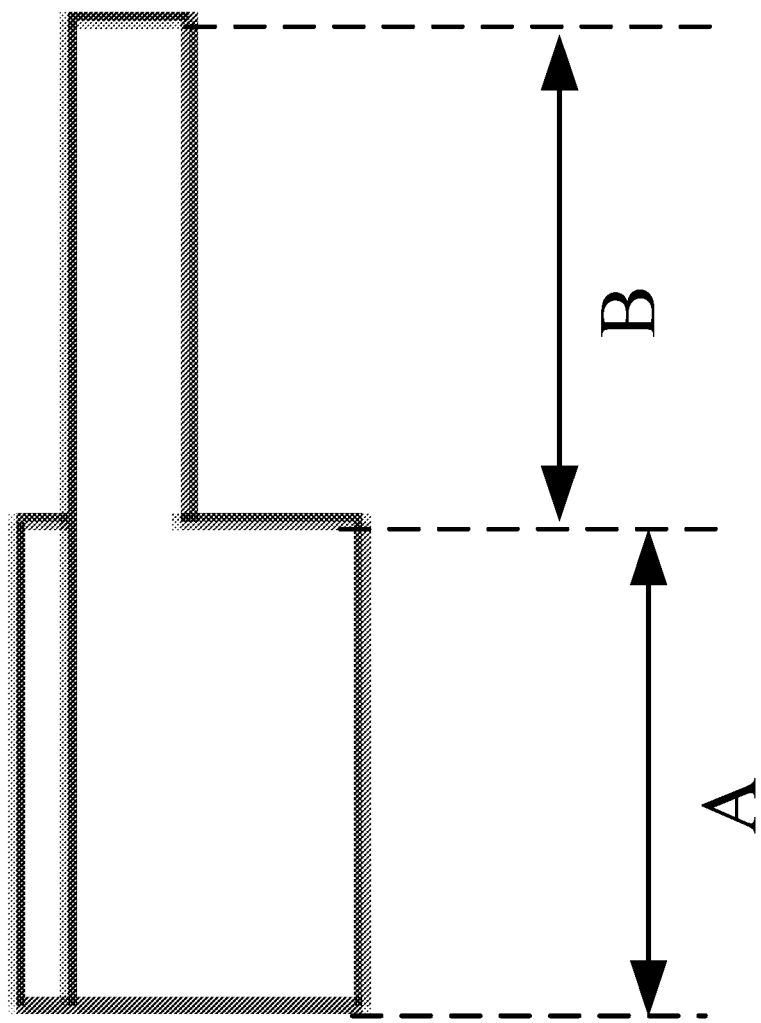
FIG. 4B is a schematic view of a structure of a buffer adhesive tape provided by an embodiment of the present disclosure.

FIG. 4B shows exemplarily a schematic view of a structure of the buffer adhesive tape in FIG. 2C. A side of the buffer adhesive tape in the inner region A of the bearing platform is in contact with the display panel (for example, the display panel 001 in FIG. 2C), and the other side of the buffer adhesive tape is attached to the platform surface of the bearing platform (for example, the bearing platform 111 in FIG. 2C), a gap is existed between the side of the buffer adhesive tape in the edge region B and the display panel, and a gap is existed between the other side of the buffer adhesive tape and the platform surface of the bearing platform. The thickness of the buffer adhesive tape in the inner region A is greater than the thickness of the buffer adhesive tape in the edge region B. Exemplarily, as illustrated in FIG. 4B, the buffer adhesive tape in the inner region A can be composed of two parts, and a back adhesive can be arranged between these two parts to enhance the adhesion of the buffer adhesive tape.

Figure 4C:
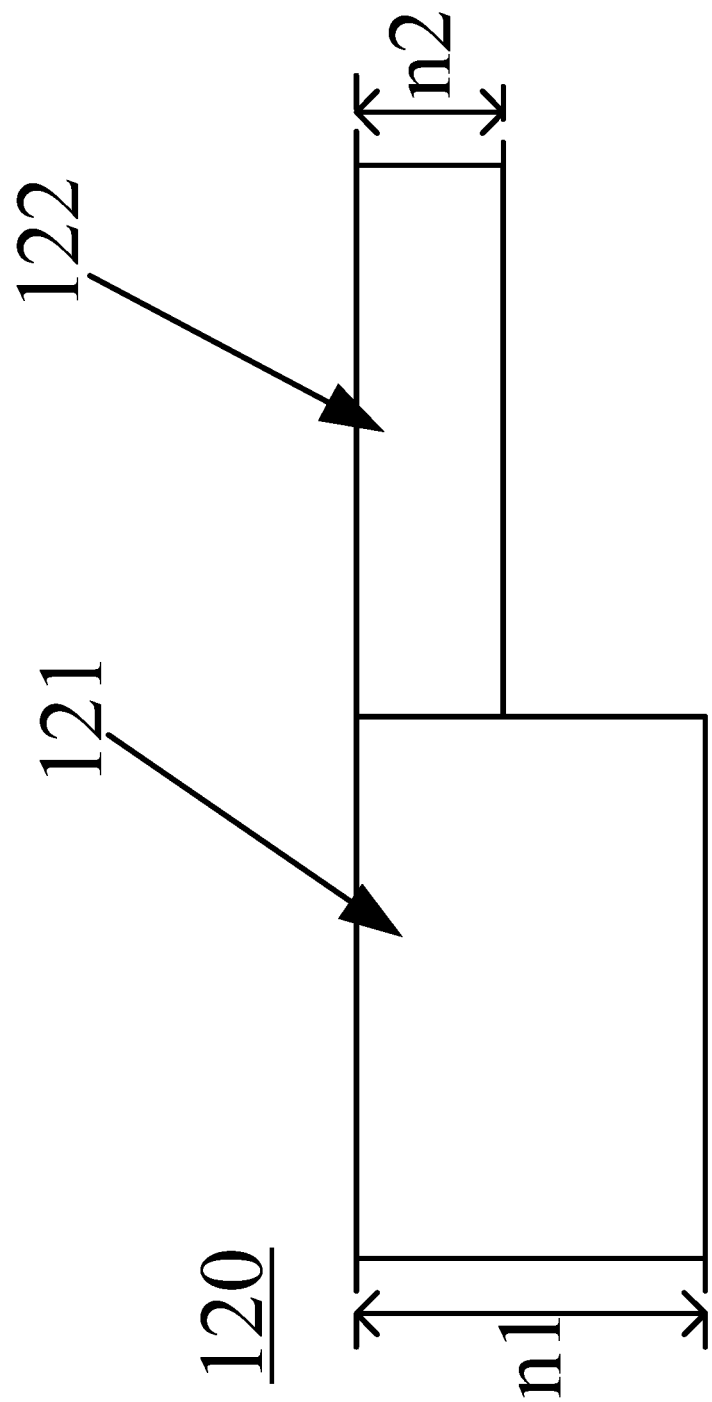
FIG. 4C is a schematic view of a structure of another buffer adhesive tape provided by an embodiment of the present disclosure.

Exemplarily, as illustrated in FIG. 4C, the buffer adhesive tape 120 can include a first sub-buffer adhesive tape 121 and a second sub-buffer adhesive tape 122, where a thickness n1 of the first sub-buffer adhesive tape 121 is greater than a thickness n2 of the second sub-buffer adhesive tape 122, the first sub-buffer adhesive tape 121 is attached to the first portion (for example, the first portion 1110 in FIG. 2B) of the inner region of the bearing platform, and a gap is existed between at least one of the second portion (for example, the second portion 1120 in FIG. 2B) of the edge region of the bearing platform and the display panel and the second sub-buffer adhesive tape 122. Optionally, a gap is existed between the second portion and the second sub-buffer adhesive tape 122, and a gap is existed between the display panel and the second sub-buffer adhesive tape 122. Optionally, a gap is existed between the second portion and the second sub-buffer adhesive tape 122, and the display is in contact with the second sub-buffer adhesive tape 122. Optionally, the second portion is in contact with the second sub-buffer adhesive tape 122, and a gap is existed between the display panel and the second sub-buffer adhesive tape 122. FIG. 4C shows exemplarily a schematic view of a structure of the buffer adhesive tape in FIG. 2A. That is, a gap is existed between the second portion and the second sub-buffer adhesive tape 122, and the display panel is in contact with the second sub-buffer adhesive tape 122.

In the embodiments of the present disclosure, the thickness of the first sub-buffer adhesive tape is greater than the thickness of the second sub-buffer adhesive tape, and the buffering capacity of the first sub-buffer adhesive tape is greater than the buffering capacity of the second sub-buffer adhesive tape. With respect to the display panel, the first sub-buffer adhesive tape functions as a primary buffer, and the second sub-buffer adhesive tape functions as an auxiliary buffer. In the embodiments of the present disclosure, the light shielding capability of the first sub-buffer adhesive tape is maintained, and the buffer performance of the first sub-buffer adhesive tape is enhanced.

Figure 4D:
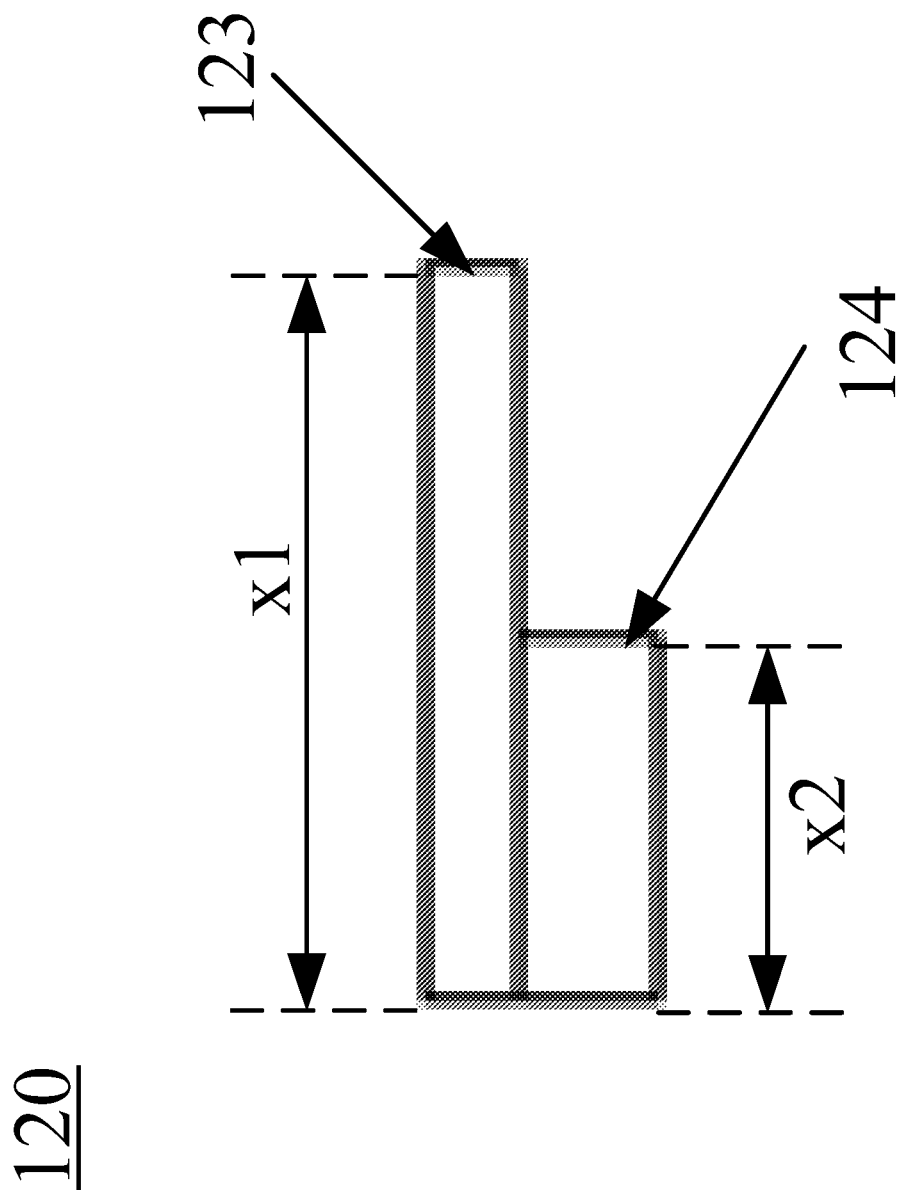
FIG. 4D is a schematic view of a structure of yet another buffer adhesive tape provided by an embodiment of the present disclosure.

FIG. 4D shows exemplarily a schematic view of a structure of the buffer adhesive tape in FIG. 2A. The buffer adhesive tape 120 herein can further include a third sub-buffer adhesive tape 123 and a fourth sub-buffer adhesive tape 124. The third sub-buffer adhesive tape 123 is arranged above the fourth sub-buffer adhesive tape 124, and the third sub-buffer adhesive tape 123 has a length x1 that is greater than a length x2 of the fourth sub-buffer adhesive tape 124. A side of the third sub-buffer adhesive tape 123 is in contact with the display panel, a first region (the first region is opposite to the inner region of the bearing platform) of the other side of the third sub-buffer adhesive tape 123 is attached to a side of the fourth sub-buffer adhesive tape 124, and the other side of the fourth sub-buffer adhesive tape 124 is attached to the platform surface of the bearing platform. Further, to enhance the adhesion of the buffer adhesive tape, a back adhesive can be arranged between the third sub-buffer adhesive tape 123 and the fourth sub-buffer adhesive tape 124. Exemplarily, the third sub-buffer adhesive tape 123 can be made of a foam or the like material having good buffer performance, and the fourth sub-buffer adhesive tape 124 can be made of a silica gel, a foam or the like material without slag-drop.

Figure 4E:
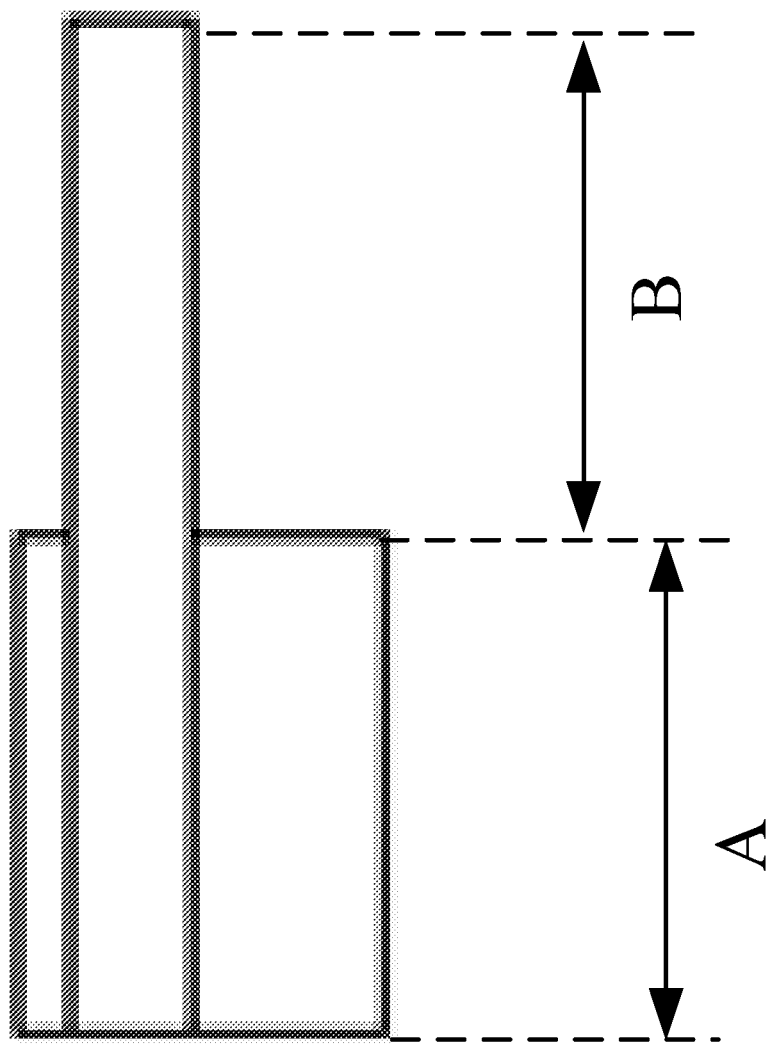
FIG. 4E is a schematic view of a structure of still yet another buffer adhesive tape provided by an embodiment of the present disclosure.

In addition, the buffer adhesive tape in FIG. 4B can also be as illustrated in FIG. 4E. The buffer adhesive tape in the inner region A of the bearing platform can be composed of three overlapping parts, and a back adhesive can be arranged between two adjacent parts. A gap is existed between a side of the buffer adhesive tape in the edge region B of the bearing platform and the display panel, and a gap is existed between the other side of the buffer adhesive tape and the platform surface of the bearing platform.

Exemplarily, as illustrated in FIG. 5A, the buffer adhesive tape 120 in the embodiments of the present disclosure can be an integral hollow-square-shaped structure. When the buffer adhesive tape is arranged on the bearing platform of the positioning frame, the arranging operation can be completed at one time.

Exemplarily, as illustrated in FIG. 5B, the buffer adhesive tape 120 in the embodiments of the present disclosure can also be defined by enclosure of four adhesive tape strips. When the buffer adhesive tape is arranged on the bearing platform of the positioning frame, each of the adhesive tape strips can be separately arranged on the bearing platform.

It should be added that FIG. 5A and FIG. 5B illustrate top views of the buffer adhesive tape. FIG. 1A to FIG. 4E illustrate side views of the buffer adhesive tape.

The backlight module provided by the embodiments of the present disclosure is applicable to vehicle-mounted displays, monitors, televisions, laptop computers, industry control display devices, medical display devices, navigators, mobile phones, digital camera frames and the like products or components having the display function, and is particularly applicable to display apparatus having a high brightness, for example, vehicle-mounted displays.

In summary, in the backlight module provided by the embodiments of the present disclosure, since the distance from the platform surface in the inner region of the bearing platform of the positioning frame to the display panel is greater than the distance from the platform surface in the edge region of the bearing platform to the display panel, a side of the buffer adhesive tape in the inner region is in contact with the display panel and the other side of the buffer adhesive tape is attached to the platform surface, and the buffer adhesive tape in the inner region has a great thickness, therefore, when the flatness of the bearing platform is poor, the display panel can be prevented from suffering a stress on the buffer adhesive tape, such that the display has a more uniform brightness, thereby improving the display effect of the black-state pictures.

There is further provided in an embodiment of the present disclosure a display apparatus. The display apparatus can include the backlight module as described in the above embodiments.

The display apparatus can be a vehicle-mounted display, a monitor, a television, a laptop computer, an industry control display device, a medical display device, a navigator, a mobile phone, a digital camera frame and the like product or component having the display function. The display apparatus provided by the embodiments of the present disclosure can be applicable to vehicle-mounted display, medical display, aerial display, industrial control, smart home and the like fields.

Figure 6:
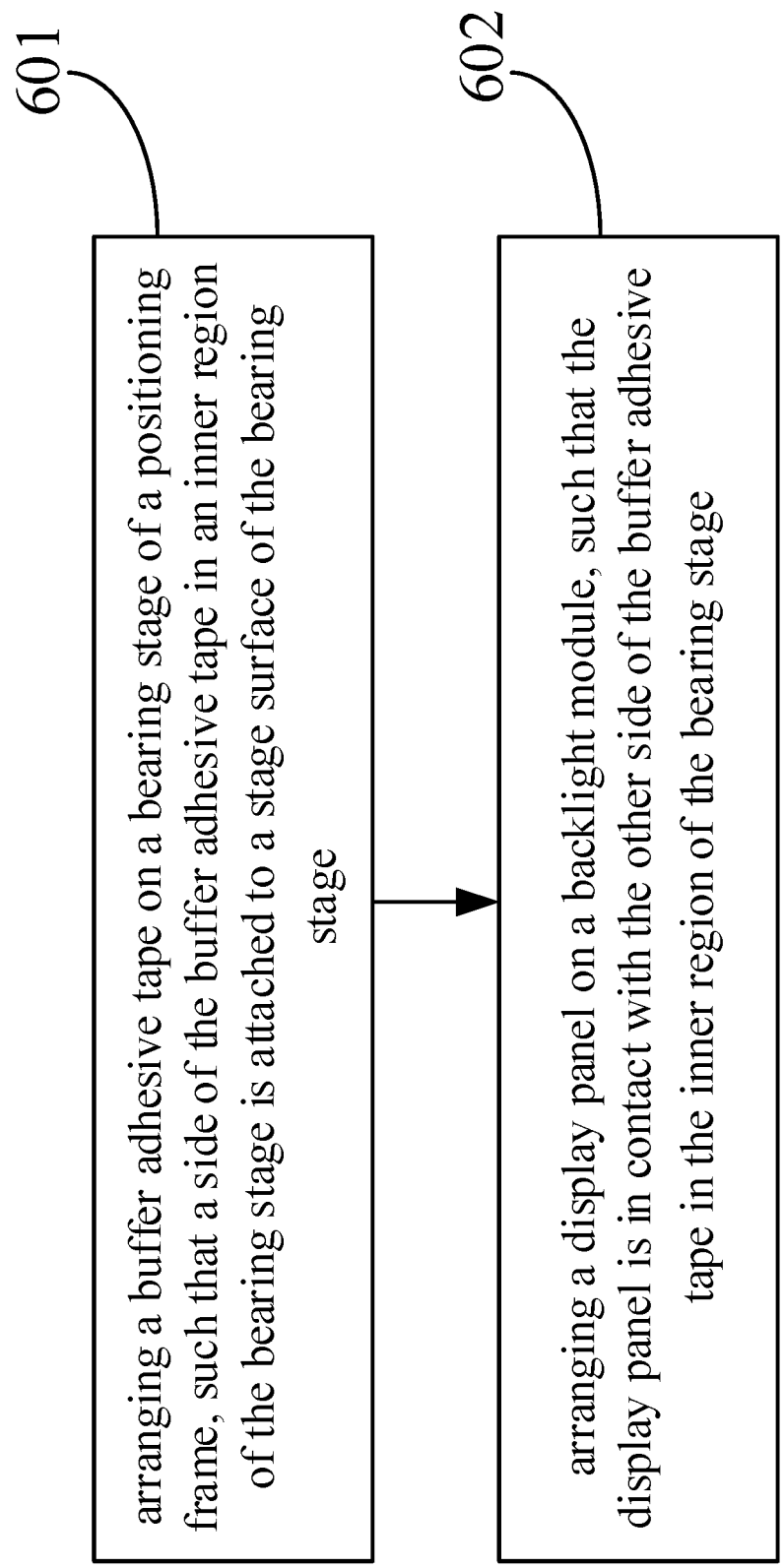
FIG. 6 is a flowchart of a method for manufacturing a display apparatus provided by an embodiment of the present disclosure.

There is further provided in an embodiment of the present disclosure a method for manufacturing a display apparatus. As illustrated in FIG. 6, the method includes the following steps.

In step S601, a buffer adhesive tape is arranged on a bearing platform of a positioning frame, such that a side of the buffer adhesive tape in an inner region of the bearing platform is attached to a platform surface of the bearing platform.

Figure 7:
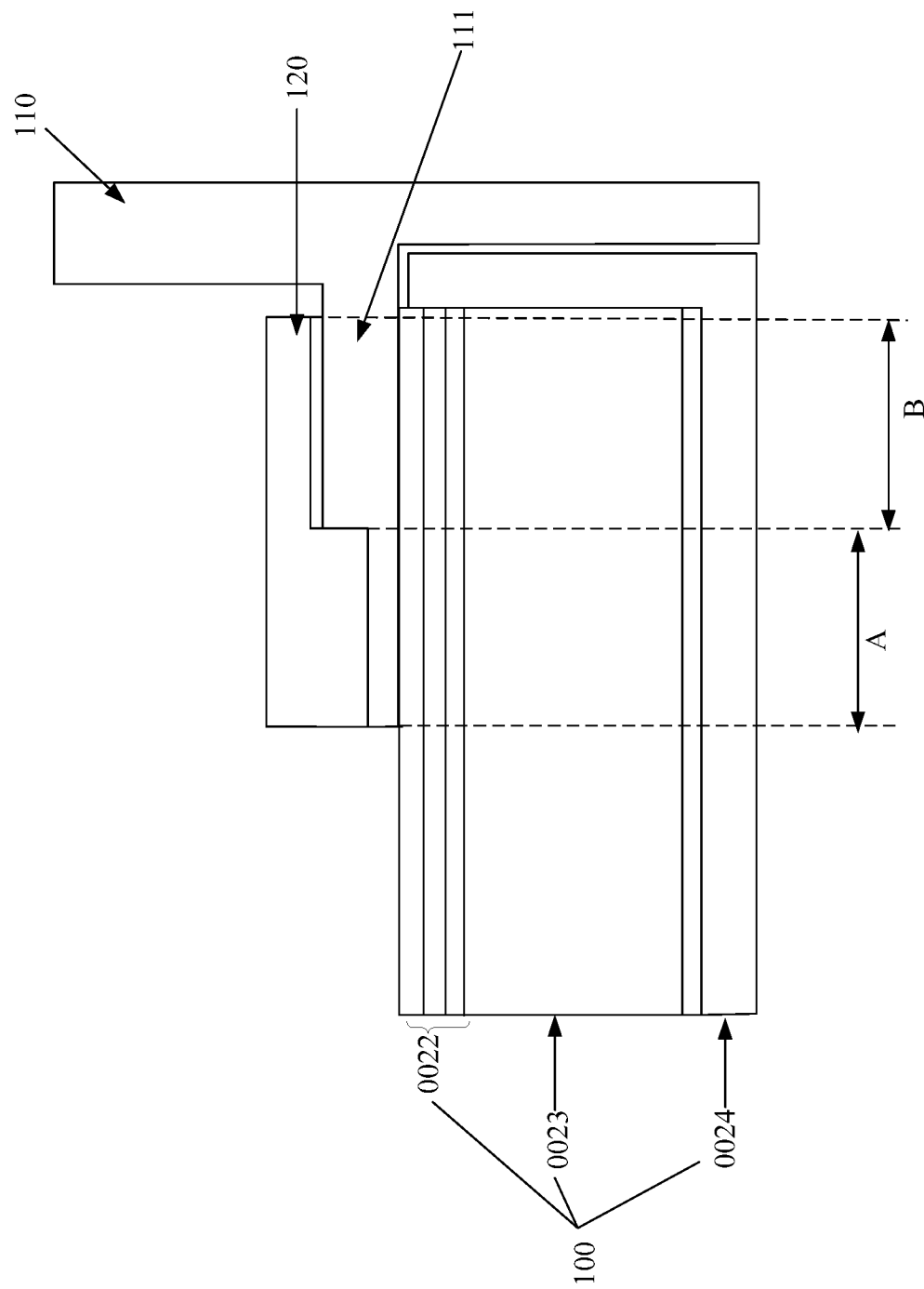
FIG. 7 is a schematic diagram of a bearing platform provided with a buffer adhesive tape provided by an embodiment of the present disclosure.

Exemplarily, as illustrated in FIG. 7, the buffer adhesive tape 120 is arranged on the bearing platform 111 of the positioning frame 110, such that a side of the buffer adhesive tape in the inner region A of the bearing platform 111 is attached to the platform surface of the bearing platform 111. Exemplarily, a gap is existed between a side of the buffer adhesive tape in the edge region B of the bearing platform 111 and the platform surface of the bearing platform 111. A back adhesive is arranged on the side where the buffer adhesive tape in the inner region A of the bearing platform 111 is attached to the platform surface of the bearing platform 111. The buffer adhesive tape cooperates with the positioning frame, so as to be used in a peripheral region of the backlight module.

In step S602, a buffer adhesive tape is arranged on the backlight module, such that a display panel is in contact with the other side of the buffer adhesive tape in the inner region of the bearing platform.

The backlight module in the method for manufacturing a display apparatus is the backlight module described in the above embodiments.

As illustrated in FIG. 2A, the display panel 001 is arranged on the backlight module 100, such that the display panel 001 is in contact with the other side of the buffer adhesive tape 120 in the inner region A of the bearing platform. Exemplarily, the other side of the buffer adhesive tape in the edge region B of the bearing platform can be in contact with the display panel 001.

A distance d1 from the platform surface of the inner region A of the bearing platform 111 of the positioning frame 110 to the display panel 001 is greater than a distance d2 from the platform surface of the edge region B of the bearing platform 111 to the display panel 001. Since the distance from the platform surface in the inner region of the bearing platform of the positioning frame to the display panel is greater than the distance from the platform surface in the edge region of the bearing platform to the display panel, a side of the buffer adhesive tape in the inner region is in contact with the display panel and the other side of the buffer adhesive tape is attached to the platform surface, and the buffer adhesive tape in the inner region has a great thickness, therefore, when the flatness of the bearing platform is poor, the display panel can be prevented from suffering a stress on the buffer adhesive tape, such that the display has a more uniform brightness, thereby improving the display effect of the black-state pictures.

Referring to FIG. 2A, the display panel 001 can include a lower polarizer 0013, a TFT substrate 01, a color film substrate 0011 and an upper polarizer 0012.

In summary, with the method for manufacturing the display apparatus provided by the embodiments of the present disclosure, a buffer adhesive tape is arranged on the bearing platform of the positioning frame, and then the display panel is arranged on the backlight module. In addition, in the backlight module, the distance from the platform surface in the inner region of the bearing platform of the positioning frame to the display panel is greater than the distance from the platform surface in the edge region of the bearing platform to the display panel, a side of the buffer adhesive tape in the inner region is in contact with the display panel and the other side of the buffer adhesive tape is attached to the platform surface, and the buffer adhesive tape in the inner region has a great thickness, therefore, when the flatness of the bearing platform is poor, the display panel can be prevented from suffering a stress on the buffer adhesive tape. Thus, with this method, the display has a more uniform brightness, thereby improving the display effect of the black-state pictures.

Persons of ordinary skill in the art can understand that all or part of the steps described in the above embodiments can be completed through hardware, or through relevant hardware instructed by programs stored in a non-transitory computer readable storage medium, such as read-only memory, disk or CD, etc.

The foregoing is only exemplary embodiments of the present disclosure, and are is not intended to limit the present disclosure. Within the spirits and principles of the disclosure, any modifications, equivalent substitutions, improvements, etc., shall fall into the protection scope of appended claims of the present disclosure.

What is claimed is:

1. A backlight module, comprising: a positioning frame and a buffer adhesive tape;
    wherein a display panel is arranged on a bearing platform of the positioning frame, and a distance from a platform surface in an inner region of the bearing platform to the display panel is greater than a distance from a platform surface in an edge region of the bearing platform to the display panel; and
    the buffer adhesive tape is arranged on the bearing platform, a side of the buffer adhesive tape in the inner region is in contact with the display panel and the other side of the buffer adhesive tape is attached to the platform surface, and a back adhesive is arranged on the side which is attached to the platform surface of the bearing platform, of the buffer adhesive tape; and
    wherein a gap is existed between at least one of the display panel and the platform surface of the edge region of the bearing platform and the buffer adhesive tape in the edge region.

2. The backlight module according to claim 1, wherein the positioning frame is an adhesive frame;
    a bearing platform of the adhesive frame has a step shape, and a thickness of a first portion of the inner region of the bearing platform is less than a thickness of a second portion of the edge region of the bearing platform.

3. The backlight module according to claim 2, wherein the buffer adhesive tape comprises a first sub-buffer adhesive tape and a second sub-buffer adhesive tape;
    a thickness of the first sub-buffer adhesive tape is greater than a thickness of the second sub-buffer adhesive tape, the first sub-buffer adhesive tape is attached to the first portion, and a gap is existed between at least one of the second portion and the display panel and the second sub-buffer adhesive tape.

4. The backlight module according to claim 1, wherein the positioning frame is a middle iron frame;
    a bearing platform of the middle iron frame has a folded-line shape, and a thickness of a first portion of the inner region of the bearing platform is equal to a thickness of a second portion of the edge region of the bearing platform.

5. The backlight module according to claim 4, wherein the buffer adhesive tape comprises a first sub-buffer adhesive tape and a second sub-buffer adhesive tape;
    a thickness of the first sub-buffer adhesive tape is greater than a thickness of the second sub-buffer adhesive tape, the first sub-buffer adhesive tape is attached to the first portion, and a gap is existed between at least one of the second portion and the display panel and the second sub-buffer adhesive tape.

6. The backlight module according to claim 1, wherein the back adhesive is arranged on the side which is attached to the platform surface of the bearing platform of the buffer adhesive tape in the inner region.

7. The backlight module according to claim 1, wherein the buffer adhesive tape is formed as one of: an integral hollow-square-shaped structure and an enclosure of four adhesive tape strips.

8. The backlight module according to claim 1, wherein the buffer adhesive tape is made of an elastic material.

9. The backlight module according to claim 8, wherein the buffer adhesive tape is a foam adhesive tape.

10. A display apparatus, comprising a backlight module;
    wherein the backlight module comprises: a positioning frame and a buffer adhesive tape;
    a display panel is arranged on a bearing platform of the positioning frame, a distance from a platform surface in an inner region of the bearing platform to the display panel is greater than a distance from a platform surface in an edge region of the bearing platform to the display panel; and
    the buffer adhesive tape is arranged on the bearing platform, a side of the buffer adhesive tape in the inner region is in contact with the display panel and the other side of the buffer adhesive tape is attached to the platform surface, and a back adhesive is arranged on the side of the buffer adhesive tape that is attached to the platform surface of the bearing platform; and
    wherein a gap is existed between at least one of the display panel and the platform surface of the edge region of the bearing platform and the buffer adhesive tape in the edge region.

11. The display apparatus according to claim 10, wherein the positioning frame is an adhesive frame;
    a bearing platform of the adhesive frame has a step shape, and a thickness of a first portion of the inner region of the bearing platform is less than a thickness of a second portion of the edge region of the bearing platform.

12. The display apparatus according to claim 11, wherein the buffer adhesive tape comprises a first sub-buffer adhesive tape and a second sub-buffer adhesive tape;
    a thickness of the first sub-buffer adhesive tape is greater than a thickness of the second sub-buffer adhesive tape, the first sub-buffer adhesive tape is attached to the first portion, and a gap is existed between at least one of the second portion and the display panel and the second sub-buffer adhesive tape.

13. The display apparatus according to claim 10, wherein the positioning frame is a middle iron frame;
    a bearing platform of the middle iron frame has a folded-line shape, a thickness of a first portion of the inner region of the bearing platform is equal to a thickness of a second portion of the edge region of the bearing platform.

14. The display apparatus according to claim 10, wherein the back adhesive is arranged on the side, which is attached to the platform surface of the bearing platform, of the buffer adhesive tape in the inner region.

15. The display apparatus according to claim 10, wherein the buffer adhesive tape is formed as one of: an integral hollow-square-shaped structure and an enclosure of four adhesive tape strips.

16. The display apparatus according to claim 10, wherein the buffer adhesive tape is made of an elastic material.

17. The display apparatus according to claim 16, wherein the buffer adhesive tape is a foam adhesive tape.

18. A method for manufacturing a display apparatus, comprising steps of:
- arranging a buffer adhesive tape on a bearing platform of a positioning frame, such that a side of the buffer adhesive tape in an inner region of the bearing platform is attached to a platform surface of the bearing platform; and
- arranging a display panel on a backlight module, such that the display panel is in contact with the other side of the buffer adhesive tape in the inner region of the bearing platform;
- wherein the backlight module comprises: the positioning frame and the buffer adhesive tape;
- the display panel is arranged on the bearing platform of the positioning frame, and a distance from the platform surface in the inner region of the bearing platform to the display panel is greater than a distance from the platform surface in the edge region of the bearing platform to the display panel;
- the buffer adhesive tape is arranged on the bearing platform, the side of the buffer adhesive tape in the inner region is in contact with the display panel and the other side of the buffer adhesive tape is attached to the platform surface, and a back adhesive is arranged on the side, which is attached to the platform surface of the bearing platform of the buffer adhesive tape; and
- wherein a gap is existed between at least one of the display panel and the platform surface of the edge region of the bearing platform and the buffer adhesive tape in the edge region.

\* \* \* \* \*